United States Patent
Kawamata

(10) Patent No.: US 10,845,776 B2
(45) Date of Patent: Nov. 24, 2020

(54) CONTROL DEVICE, CONTROL METHOD OF CONTROL DEVICE, AND RECORDING MEDIUM

(71) Applicant: OMRON Corporation, Kyoto (JP)

(72) Inventor: Katsuyuki Kawamata, Kyoto (JP)

(73) Assignee: OMRON Corporation, Kyoto (JP)

( * ) Notice: Subject to any disclaimer, the term of this patent is extended or adjusted under 35 U.S.C. 154(b) by 301 days.

(21) Appl. No.: 16/005,685

(22) Filed: Jun. 12, 2018

(65) Prior Publication Data

US 2019/0101883 A1    Apr. 4, 2019

(30) Foreign Application Priority Data

Sep. 29, 2017    (JP) ................................ 2017-191340

(51) Int. Cl.
| | | |
|---|---|---|
| G05B 19/05 | (2006.01) | |
| G05B 19/408 | (2006.01) | |
| G01N 21/88 | (2006.01) | |
| G05B 19/401 | (2006.01) | |

(52) U.S. Cl.
CPC ......... *G05B 19/05* (2013.01); *G01N 21/8851* (2013.01); *G05B 19/401* (2013.01); *G05B 19/4083* (2013.01); *G05B 2219/36414* (2013.01); *G05B 2219/45147* (2013.01)

(58) Field of Classification Search
CPC ............................. B25J 9/1697; G05B 19/056
See application file for complete search history.

(56) References Cited

U.S. PATENT DOCUMENTS

| | | | | |
|---|---|---|---|---|
| 4,380,696 | A * | 4/1983 | Masaki | ................... B25J 19/023 |
| | | | | 219/124.34 |
| 4,568,816 | A | 2/1986 | Casler, Jr. | |
| 5,467,003 | A | 11/1995 | Kosaka et al. | |
| 2013/0211578 | A1* | 8/2013 | Tanuma | ............. G05B 19/4093 |
| | | | | 700/192 |
| 2014/0025191 | A1 | 1/2014 | Wadehn | |
| 2017/0241790 | A1* | 8/2017 | Yoshikawa | ......... G01C 21/3446 |
| 2019/0047145 | A1* | 2/2019 | Akeel | ..................... B25J 9/1697 |

FOREIGN PATENT DOCUMENTS

| | | |
|---|---|---|
| JP | 2002355605 | 12/2002 |
| JP | 2017068816 A * 4/2017 | ....... G05B 19/41865 |

OTHER PUBLICATIONS

"Search Report of Europe Counterpart Application", dated Dec. 3, 2018, p. 1-p. 9.

* cited by examiner

*Primary Examiner* — Santosh R Poudel
(74) *Attorney, Agent, or Firm* — JCIPRNET

(57) ABSTRACT

A target path is corrected using an imaging result of a workpiece and a moving distance of a control object for each control cycle is kept constant. The PLC generates a connected path for each control cycle so that a length of the corrected path for each control cycle substantially matches a length of a normative path for each control cycle.

16 Claims, 23 Drawing Sheets

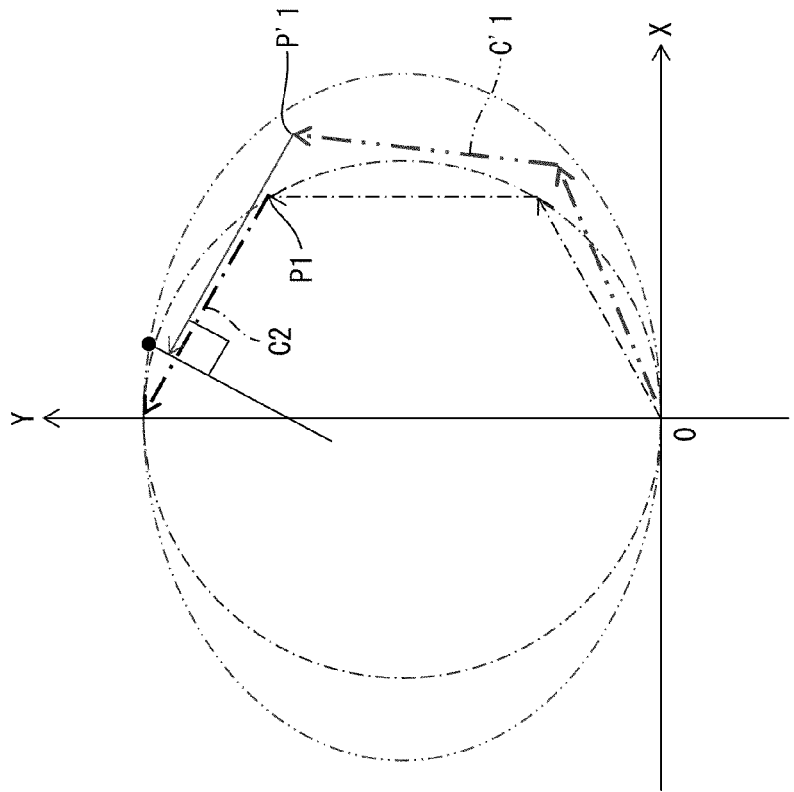
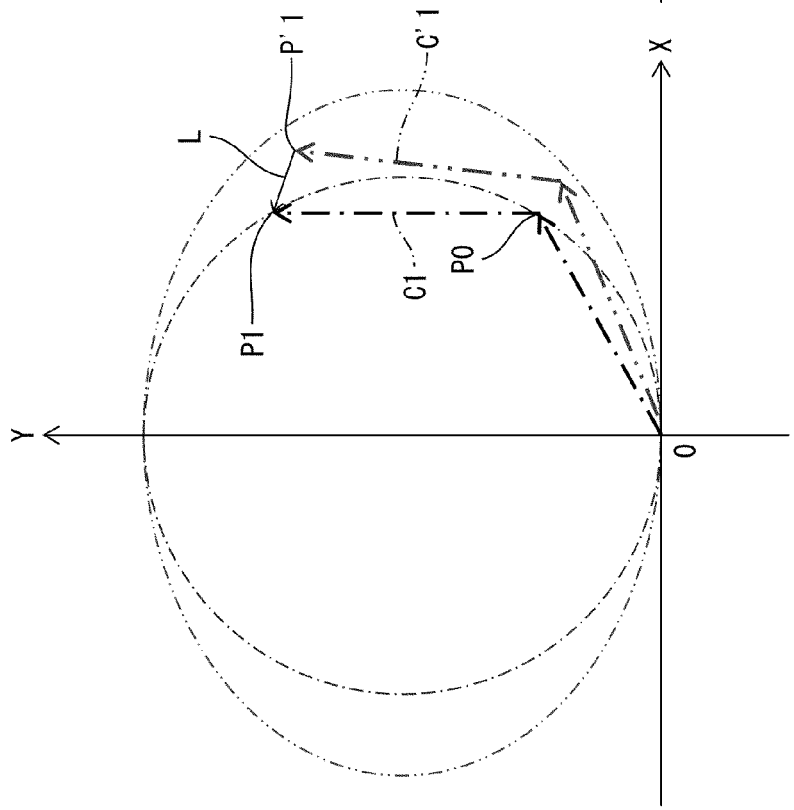
FIG. 19A
FIG. 19B

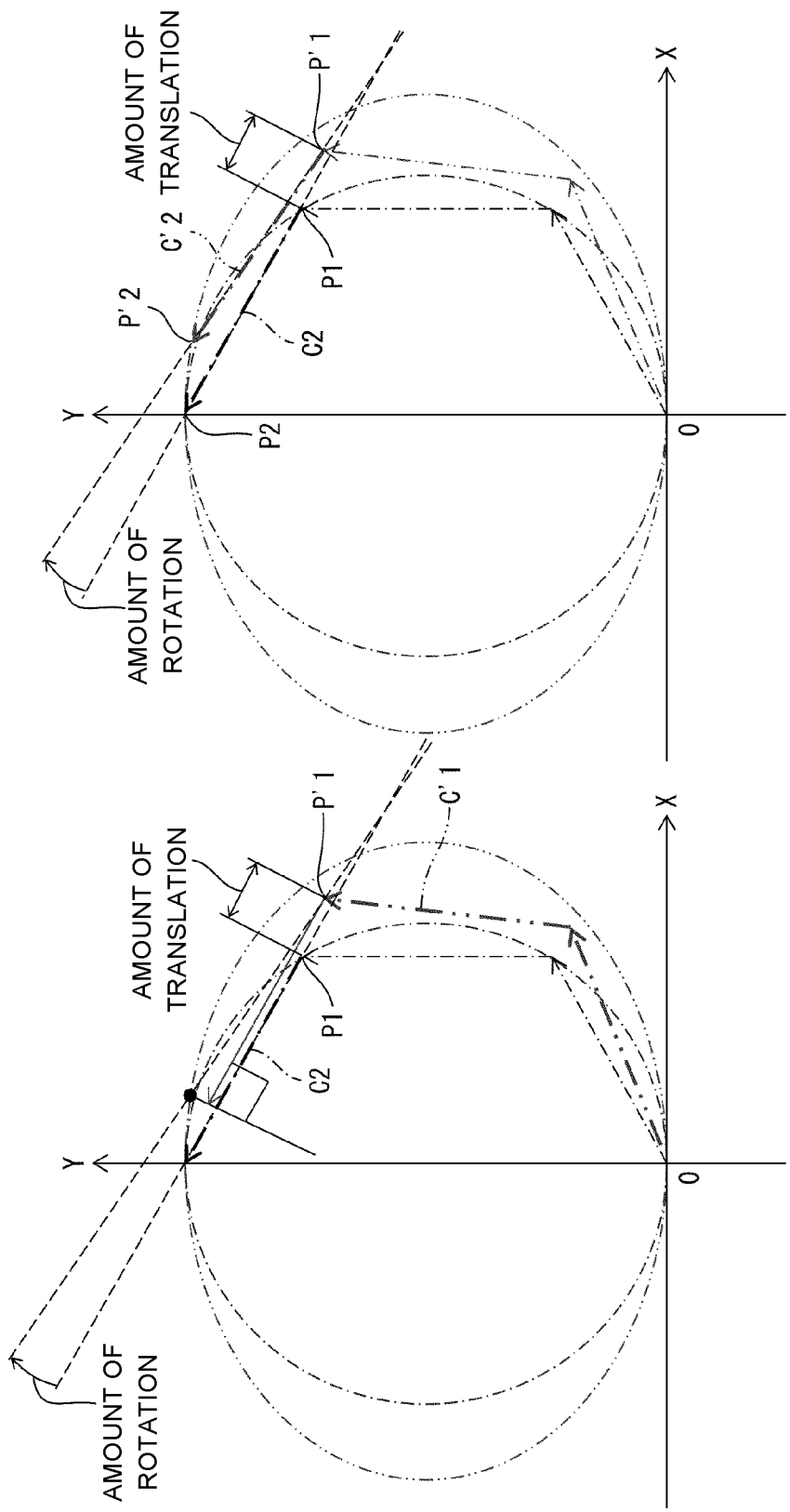

CONTROL DEVICE, CONTROL METHOD OF CONTROL DEVICE, AND RECORDING MEDIUM

CROSS-REFERENCE TO RELATED APPLICATION

This application claims the priority benefit of Japan application serial no. 2017-191340, filed on Sep. 29, 2017. The entirety of the above-mentioned patent application is hereby incorporated by reference herein and made a part of this specification.

BACKGROUND

Technical Field

The disclosure relates to a control device that generates a corrected path which is obtained by correcting a target path, which indicates a target position for each control cycle, of a control object that moves along a surface of a workpiece using an imaging result of the workpiece, and the like.

Description of Related Art

In the related art, a technique of correcting a target path serving as a reference when a control object moves along a surface of a workpiece using an imaging result of the workpiece is known. For example, Patent Document 1 (Japanese Laid-open No. 2002-355605 (published on Dec. 10, 2002)) which is described below discloses a technique of detecting an external shape pattern of a window on the basis of a captured image of the window and correcting a target path which is a movement path for a reference pattern using a result of comparison between the external shape pattern and the reference pattern.

However, in the above-mentioned techniques according to the related art, a difference between a length of a target path and a length of a corrected path obtained by correcting the target path using an imaging result is not considered.

That is, when a target path is corrected using a captured image of a workpiece in order to compensate for a difference between an ideal shape of the workpiece which is calculated from design data of the workpiece or the like and an actual shape of the workpiece, the length of the target path and the length of the corrected path may not completely match each other.

However, when the length of the target path and the length of the corrected path do not match each other but a time interval and an execution frequency of a control cycle for realizing both paths are maintained, a moving distance of the control object for each control cycle varies in the target path and the corrected path. For example, an amount of applied sealer for each position of a workpiece surface in a path which is used for control of a sealer application device or the like is proportional to a moving distance of a dispenser for each control cycle. Accordingly, when the length of the corrected path for each control cycle varies, the amount of applied sealer varies depending on positions.

SUMMARY

An embodiment of the disclosure provides a control device that generates a corrected path which is obtained by correcting a target path for a control object moving along a surface of a workpiece using an imaging result of the workpiece. The control device includes: an acquisition part configured to acquire the target path for each control cycle; and a generation part configured to generate the corrected path for each control cycle from the target path for each control cycle so that a length of the corrected path for each control cycle substantially matches a length of the target path for each control cycle.

An embodiment of the disclosure provides a control method for a control device that generates a corrected path which is obtained by correcting a target path for a control object moving along a surface of a workpiece using an imaging result of the workpiece. The control method includes: an acquisition step of acquiring the target path for each control cycle; and a generation step of generating the corrected path for each control cycle from the target path for each control cycle so that a length of the corrected path for each control cycle substantially matches a length of the target path for each control cycle.

BRIEF DESCRIPTION OF THE DRAWINGS

FIG. 19A and FIG. 19B are diagrams illustrating an example of a method of selecting a normative command serving as a basis and a method of detecting feature points for generating a corrected command which are performed by the PLC illustrated in FIG. 1.

FIG. 20A and FIG. 20B are diagrams illustrating an example of a method of calculating rotation and translation and a method of generating a corrected command C'2 using the calculated rotation and translation.

DESCRIPTION OF THE EMBODIMENTS

Figure 1:
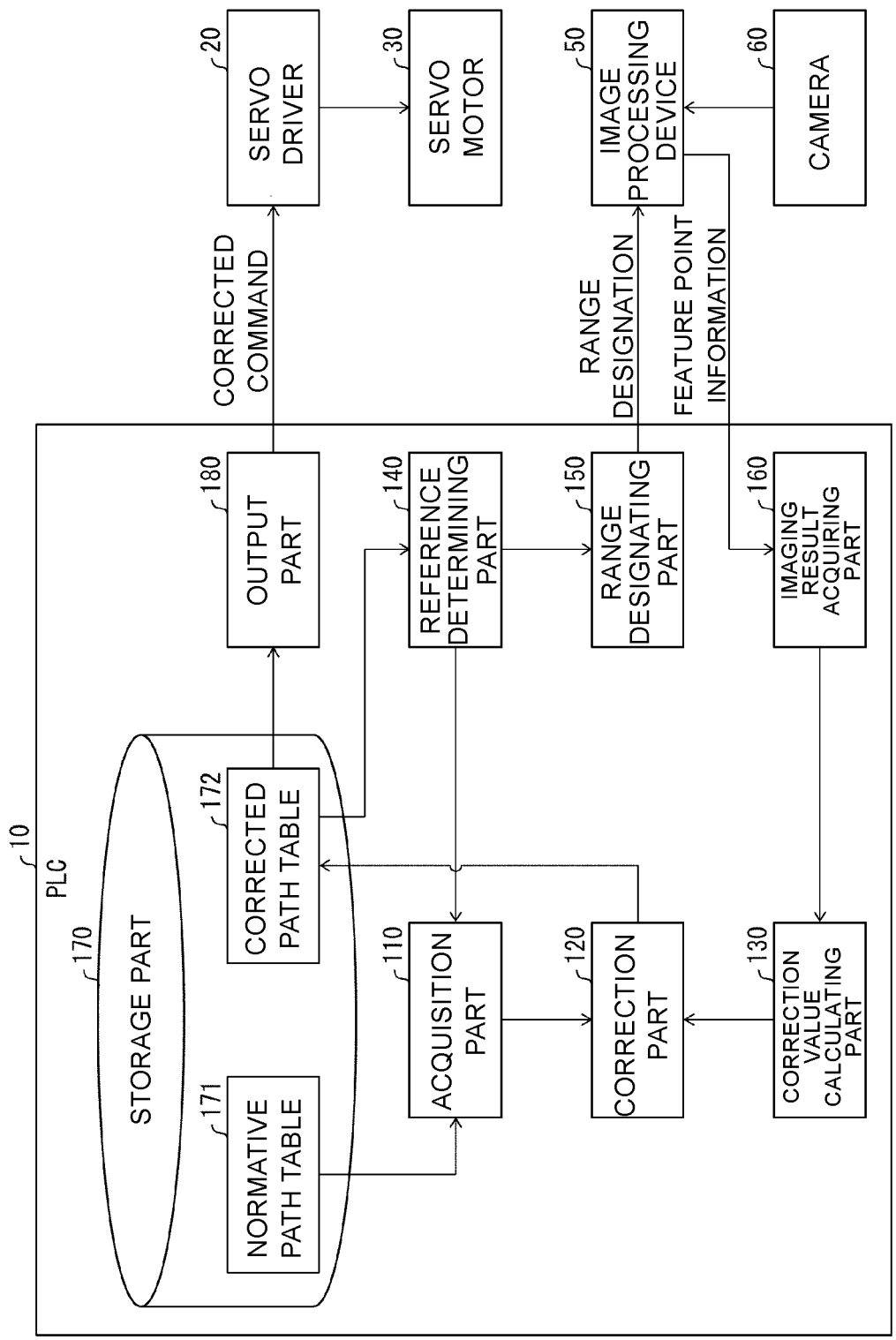
FIG. 1 is a block diagram illustrating a configuration of principal parts of a PLC according to a first embodiment of the disclosure.

The embodiments of the disclosure provide a control device and the like that can correct a target path for a control object moving along a surface of a workpiece using an imaging result of the workpiece and keep a moving distance of the control object for each control cycle constant.

According to this configuration, the control device generates the corrected path by correcting the target path using the imaging result of the workpiece, and the length of the corrected path for each control cycle substantially matches the length of the target path for each control cycle.

Accordingly, the control device can correct a target path for a control object moving along a surface of a workpiece using an imaging result of the workpiece and keep a moving distance for each control cycle of the control object constant.

The control device according to one or some exemplary embodiments of the disclosure may further include a selection part configured to select one target path of target paths of a (j+1)-th control cycle and control cycles before and after the (j+1)-th control cycle as the target path corresponding to the corrected path of an (i+1)-th control cycle when a corrected path of an i-th control cycle is generated from a target path of a j-th control cycle where i and j are integers equal to or greater than 1, and the generation part may generate the corrected path of the (i+1)-th control cycle from the target path of the control cycle selected by the selection part.

According to this configuration, the control device generates the corrected path of the (i+1)-th control cycle from one target path selected from the target paths of the (j+1)-th control cycle and the control cycles before and after the (j+1)-th control cycle.

Here, the total distance (length) of the target path set on the basis of design data of the workpiece or the like may not match the total distance (length) of the corrected path generated on the basis of an actual shape of the workpiece. When the length in the target path does not match the length in the corrected path but the time interval and the execution frequency of the control cycle in which both paths are implemented are maintained, a moving distance of the control object for each control cycle is different between the target path and the corrected path.

Therefore, the control device compensates for the difference in length between the target path and the corrected path while maintaining the moving distance of the control object for each control cycle and the length of the control cycle by adjusting the execution frequency of the control cycle.

Specifically, the control device adjusts the execution frequency of the control cycle by generating the corrected path of the (i+1)-th control cycle from one target path selected from the target paths of the (j+1)-th control cycle and the control cycles before and after the (j+1)-th control cycle. For example, the control device adjusts the execution frequency of the control cycle by generating the corrected path of the (i+1)-th control cycle from the target path of any one of the j-th, (j+1)-th, and (j+2)-th control cycles.

Accordingly, the control device can correct the target path using an imaging result of the workpiece and keep the moving distance of the control object for each control cycle constant by adjusting the execution frequency of the control cycle.

The control device according to one or some exemplary embodiments of the disclosure may further include a result acquiring part configured to start acquisition of the imaging result corresponding to a target position of the corrected path of an (i+2k)-th control cycle repeatedly in k times the control cycle at the latest at a time point at which the control object reaches the target position of the corrected path of the i-th control cycle where i is an integer equal to or greater than 1 and k is an integer such that k times the control cycle is larger than a time required from generation of the imaging result to acquisition of the imaging result, and the generation part may generate the corrected paths of (i+k+1)-th to (i+2k)-th control cycles using the imaging result acquired by the result acquiring part.

According to this configuration, the control device starts acquisition of the imaging result corresponding to the target position of the (i+2k)-th control cycle repeatedly in k times the control cycle at the latest at a time point at which the control object reaches the target position of the i-th control cycle.

Here, k times the control cycle is larger than the time required from generation of the imaging result to acquisition of the imaging result. The control device starts acquisition of the imaging result corresponding to a target position of the (i+2k)-th control cycle (that is, the imaging result corresponding to the control cycle 2k control cycles before) at the latest at the time point at which the control object reaches the target position of the i-th control cycle. Accordingly, the control device can acquire the "imaging result corresponding to the control cycle 2k control cycles before" at the latest in the (i+k)-th control cycle repeatedly in k times the control cycle.

The control device generates the corrected paths of the (i+k+1)-th to (i+2k)-th control cycles using the imaging result acquired by the result acquiring part. That is, the control device acquires the imaging result at the latest in the (i+k)-th control cycle, and generates the corrected paths of the (i+k+1)-th to (i+2k)-th control cycles using the acquired imaging result.

Accordingly, the control device can generate the corrected paths by acquiring the imaging result of a desired part of the workpiece repeatedly in k times the control cycle instead of the imaging result of the whole workpiece.

The control device can generate the corrected paths of the (i+k+1)-th to (i+2k)-th control cycles using the imaging result acquired at the latest in the (i+k)-th control cycle. That is, the control device acquires the imaging result corresponding to the control cycle 2k control cycles before repeatedly in the k times the control cycle and generates the corrected paths of the (i+k+1)-th to (i+2k)-th control cycles at the latest in the (i+k)-th control cycle.

Accordingly, the control device can acquire the imaging result of a desired part of the workpiece repeatedly in k times the control cycle without interrupting generation of the corrected path and generate the corrected paths.

In the control device according to one or some exemplary embodiments of the disclosure, the generation part may generate the corrected paths of first to 2k-th control cycles in advance, and the result acquiring part may start acquisition of the imaging result corresponding to the target position of the corrected path of a 3k-th control cycle at the latest at a time point at which the control object reaches the target position of the corrected path of a k-th control cycle.

According to this configuration, the control device generates the corrected paths of the first to 2k-th control cycles in advance. The control device starts acquisition of the imaging result corresponding to the target position of the corrected path of the 3k-th control cycle at the latest at the time point at which the control object reaches the target position of the corrected path of the k-th control cycle.

That is, the control device performs control using the corrected paths of the first to 2k-th control cycles, which have been generated in advance, in the first to 2k-th control cycles.

The control device starts acquisition of the imaging result corresponding to the target position of the corrected path of the 3k-th control cycle at the latest at the time point at which the control object reaches the target position of the corrected path of the k-th control cycle. Accordingly, the control device acquires the "imaging result corresponding to the target position of the corrected path of the 3k-th control cycle" at the latest in the 2k-th control cycle. The control device generates the corrected paths of the (2k+1)-th to 3k-th control cycles using the imaging result acquired at the latest in the 2k-th control cycle. That is, the control device generates the corrected paths of the (2k+1)-th to 3k-th control cycles during execution of the control using the corrected paths of the first to 2k-th control cycles which have been generated in advance.

Accordingly, the control device can acquire the imaging result of a desired part of the workpiece repeatedly in k times the control cycle without interrupting generation of the corrected path and generate the corrected paths of the control cycles subsequent to the first control cycle.

In the control device according to one or some exemplary embodiments of the disclosure, the selection part may (1) use the corrected path of an (i+2k)-th control cycle among the corrected paths of (i+k+1)-th to (i+2k)-th control cycles which are repeatedly generated in k times the control cycle by the generation part to (2) select one target path from the target paths of a (j+3k)-th control cycle and control cycles before and after the (j+3k)-th control cycle as the target path corresponding to the corrected path of an (i+3k)-th control cycle.

According to this configuration, the control device selects one target path from the target paths of the (j+3k)-th control cycle and the control cycles before and after the (j+3k)-th control cycle as the target path corresponding to the corrected path of the (j+3k)-th control cycle using the corrected path of the (j+2k)-th control cycle.

As described above, the total distance (length) of the target path may not match the total distance (length) of the corrected path. The control device generates the corrected path for each control cycle so that the length of the corrected path for each control cycle substantially matches the length of the target path for the corresponding control cycle. Accordingly, the target position (the end point) of the corrected path of a certain control cycle does not necessarily approximate the target position of the target path in the certain control cycle.

For example, the target position of the corrected path of a certain control cycle which is generated by the control device may be located closer to the target position of the target path of the control cycle previous to the certain control cycle than to the target position of the target path of the certain control cycle. In this case, the control device generates the corrected path of the control cycle subsequent to the certain control cycle as follows in order to substantially match the lengths of the corrected path and the target path for each control cycle and to curb a separation therebetween. That is, the control device generates the corrected path of the control cycle subsequent to the certain control cycle using the target path of the certain control cycle.

For example, the target position of the corrected path of a certain control cycle which is generated by the control device may be located closer to the target position of the target path of the control cycle subsequent to the certain control cycle than to the target position of the target path of the certain control cycle. In this case, the control device generates the corrected path of the control cycle subsequent to the certain control cycle as follows in order to substantially match the lengths of the corrected path and the target path for each control cycle and to curb separation therebetween. That is, the control device generates the corrected path of the control cycle subsequent to the certain control cycle using the target path of the certain control cycle two cycles after the certain control cycle Accordingly, the control device determines the target path of the control cycle which is optimal for generating the corrected path of the control cycle k control cycles before using the generated corrected path. Specifically, the control device selects one target path from the target paths of the (j+3k)-th control cycle and the control cycles before and after the (j+3k)-th control cycle as the target path corresponding to the corrected path of the (j+3k)-th control cycle using the corrected path of the (j+2k)-th control cycle. For example, the control device determines the target path corresponding to the corrected path of the (j+3k)-th control cycle from the target paths of the (j+3k−1)-th, (j+3k)-th, and (j+3k+1)-th control cycles using the corrected path of the (j+2k)-th control cycle.

Accordingly, the control device can curb separation of the corrected path from the target path and substantially match the length of the corrected path for each control cycle with the length of the target path for the corresponding control cycle.

In the control device according to one or some exemplary embodiments of the disclosure, the generation part may generate vectors indicating the corrected paths corresponding to k continuous control cycles repeatedly in k times the control cycle by performing at least one of rotation and parallel translation on vectors indicating the target paths corresponding to the k continuous control cycles using the imaging result acquired by the result acquiring part.

According to this configuration, the control device generates the vectors indicating the corrected paths of the control cycles by performing at least one of rotation and parallel translation on the vectors indicating the target paths of the control cycles using the imaging result.

Accordingly, the control device can generate the corrected path for each control cycle so that the length of the corrected path for each control cycle substantially matches the length of the target path for the corresponding control cycle using the imaging result.

According to this method, the control method generates the corrected path by correcting the target path using the imaging result of the workpiece, and the length of the corrected path for each control cycle substantially matches the length of the target path for each control cycle.

Accordingly, the control method can correct a target path for a control object moving along a surface of a workpiece using an imaging result of the workpiece and keep a moving distance for each control cycle of the control object constant.

According to the embodiments of the disclosure, it is possible to correct a target path for a control object moving along a surface of a workpiece using an imaging result of the workpiece and to keep a moving distance of the control object for each control cycle constant.

First Embodiment

Hereinafter, an embodiment associated with an aspect of the disclosure (hereinafter also referred to as this embodiment) will be described with reference to FIGS. 1 to 23. The same or corresponding elements in the drawings will be referred to by the same reference signs and description thereof will not be repeated. In this embodiment, a programmable logic controller (PLC) that controls a control object such as a machine and a facility is described as a representative example of a control device (a controller).

*1. Application Example

Figure 2:
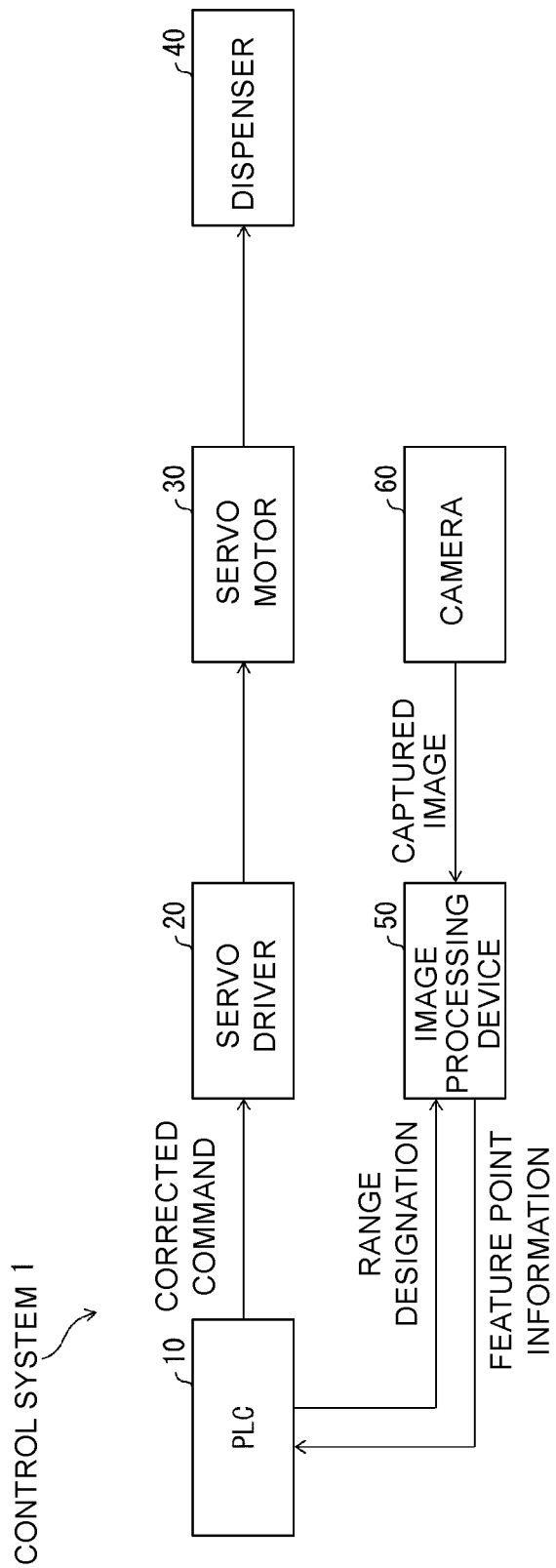
FIG. 2 is a diagram illustrating an entire outline of a control system including the PLC illustrated in FIG. 1.

For the purpose of easy understanding of a PLC 10 (a control device) according to an embodiment of the disclosure, the outline of a control system 1 including the PLC 10 will be specifically described as an example in which the disclosure is applied with reference to FIG. 2.

FIG. 2 is a diagram illustrating an entire outline of the control system 1. The control system 1 includes the PLC 10, a servo driver 20, a servo motor 30, a dispenser 40, an image processing device 50, and a camera 60.

The PLC 10 receives normative command data (a target path, a command path) for coating, grinding, polishing, or the like from the outside source such as a user. In the control system 1, the PLC 10 receives normative command data for the dispenser 40 moving along a surface of a workpiece. The PLC 10 generates a normative command (a command position) for each control cycle from the received normative command data, that is, generates a normative command for each control cycle (a target path for each control cycle).

Since the normative command data is generated and set on the basis of an ideal shape of a workpiece such as design data of the workpiece or the like, the PLC 10 generates corrected command data (a corrected path) which is obtained by correcting the normative command data on the basis of an actual shape of the workpiece (an actual object). Specifically, the PLC 10 generates a corrected command for each control cycle which is obtained by correcting a normative command for each control cycle using an imaging result (or an analysis result of a captured image) of the workpiece from the camera 60.

The normative command for each control cycle and the corrected command for each control cycle are information indicating a target position for each control cycle of the dispenser 40 and thus are also referred to as a "a normative path" and a "corrected path," respectively, in the following description.

The PLC 10 inputs the generated corrected command to the servo driver 20 for each control cycle, and the servo driver 20 drives the servo motor 30 on the basis of the input corrected command to move the dispenser 40 as a control object.

Since the corrected path generated by the PLC 10 is obtained by correcting a normative path on the basis of the actual shape of the workpiece, a distance of the corrected path may be different from a distance of the normative path. Therefore, the PLC 10 adjusts the corrected target position (the corrected path) for each control cycle so that a speed of the control object can be kept constant. The PLC 10 adjusts the corrected target position (the corrected path) for each control cycle so that the speed of the control object can be kept constant, for example, by adjusting an execution frequency of the control cycle and increasing or decreasing the execution frequency of the control cycle of the corrected path with respect to the execution frequency of the control cycle of the normative path.

A "control cycle" is a cycle in which the PLC 10 repeatedly performs a control operation. Specifically, the PLC 10 outputs a command (a corrected command) to the servo driver 20 for each control cycle, that is, outputs a corrected command for each control cycle to the servo driver 20.

In the following description, "i," "n," "x," and "y" refer to an "integer equal to or greater than 1" unless otherwise mentioned, and a "normative path (a path command) Ci−1" denotes a path command of the i-th control cycle. Similarly, a "corrected path (a corrected command) C'i−1" denotes a corrected path of the i-th control cycle. When a "normative path Ci" is simply described and "to which control cycle the normative path belongs" is not specified, the "normative path Ci" may refer to a "normative path for each control cycle." Similarly, when a "corrected path C'i" is simply described and "to which control cycle the corrected path belongs" is not specified, the "corrected path C'i" may refer to a "corrected path for each control cycle." A target position (an end point, a destination) of the normative path Ci for each control cycle is referred to as "Pi," and a target position (an end point) of the corrected path C'i for each control cycle is referred to as "P'i." A path connecting the normative paths Ci of all the control cycles is referred to as a "normative command C," and a path connecting the corrected paths C'i of all the control cycles is referred to as a "corrected path C'."

The PLC 10 sequentially outputs the corrected path C'i for each control cycle to the servo driver 20, and the servo driver 20 continuously performs control on the basis of the corrected path C'i for each control cycle received from the PLC 10. Specifically, the PLC 10 outputs a corrected path C'1 of the second control cycle, a corrected path C'2 of the third control cycle, a corrected path C'3 of the fourth control cycle, . . . , and a corrected path C'n−1 of the n-th control cycle sequentially from a corrected path C'0 of the first control cycle. The servo driver 20 continuously controls the servo motor 30 on the basis of the corrected paths C'0, C'1, C'2, C'3, . . . , C'n−1 received from the PLC 10. By causing the servo driver 20 to control driving of the servo motor 30 on the basis of the corrected path C'i for each control cycle, a path of position change of the control cycles of the dispenser substantially matches the corrected path C'i.

The servo driver 20 is connected to the PLC 10 and drives the servo motor 30 on the basis of the corrected path C'i of each control cycle from the PLC 10. More specifically, the servo driver 20 receives a corrected path C'i (a corrected command, an input path) from the PLC 10 in a constant cycle (a control cycle). The servo driver 20 acquires measured values associated with the operation of the servo motor 30 such as a position, a speed (which is typically calculated from a difference between a current position and a previous position), and a torque from detectors such as a position sensor (a rotary encoder) connected to a shaft of the servo motor 30 and a torque sensor. The servo driver 20 sets the corrected path C'i from the PLC 10 as a target value and performs feedback control with the measured values as feedback values. That is, the servo driver 20 adjusts a current for driving the servo motor 30 so that the measured values approach the target value. The servo driver 20 may be referred to as a servo motor amplifier.

The servo motor 30 moves the dispenser 40 under the control of the servo driver 20, and the dispenser 40 is, for example, a sealer application head.

The image processing device 50 receives designation of a range (information for designating an imaging range of the camera 60) from the PLC 10 and causes the camera 60 to image a "part of an actual workpiece (an actual object)" corresponding to the received designation of a range. The image processing device 50 acquires a captured image associated with the "part of a workpiece" imaged by the camera 60 from the camera 60, analyzes the acquired captured image, and generates feature point information. Details of the feature point information will be described later with reference to FIG. 3 or the like. The image processing device 50 outputs the generated feature point information to the PLC 10.

*2. Example of Configuration

Figure 3:
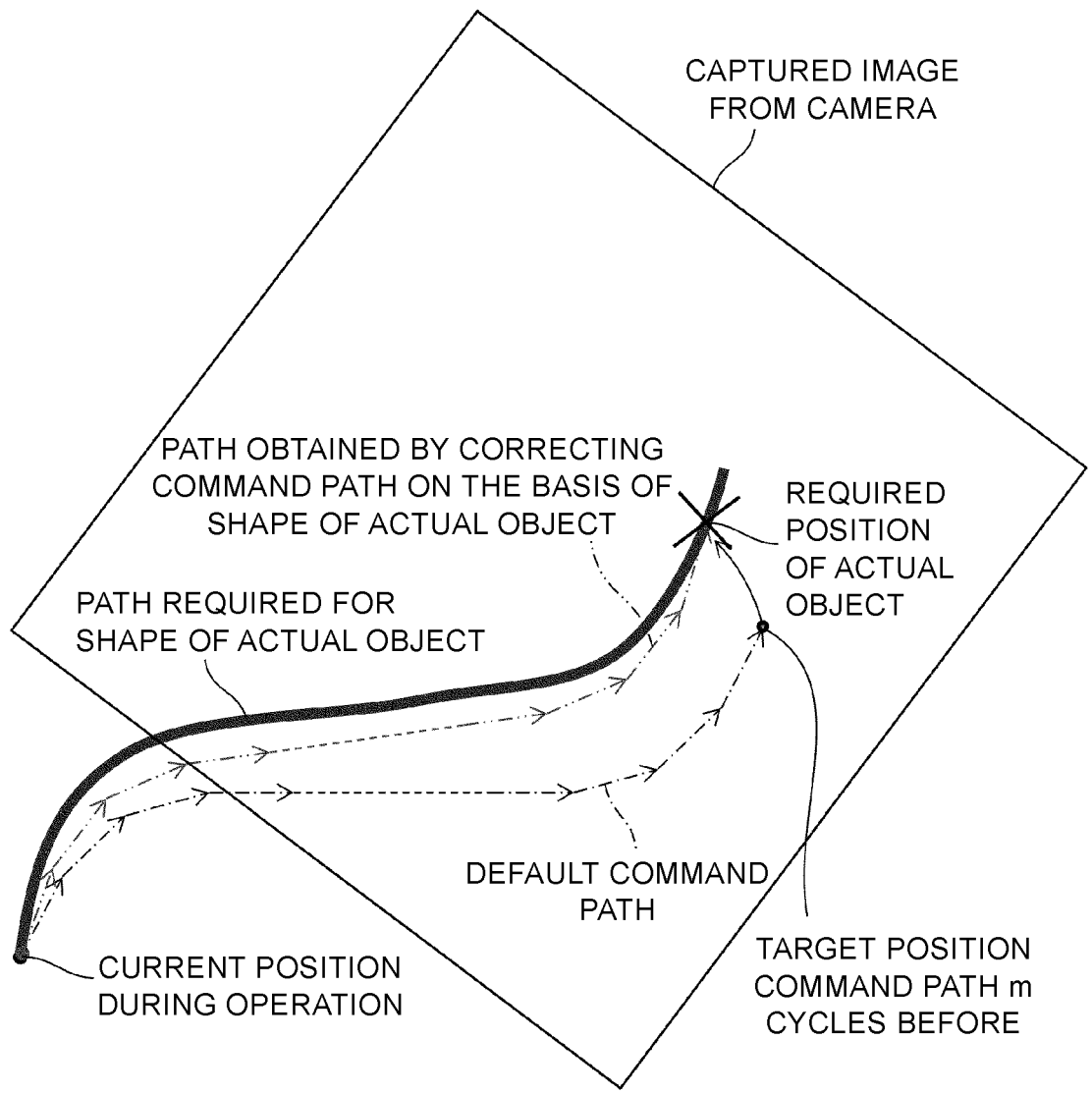
FIG. 3 is a diagram illustrating an outline of a method of generating a corrected path which is performed by the PLC illustrated in FIG. 1.

FIG. 3 is a diagram illustrating an outline of a method of generating a corrected path C'i which is performed by the PLC 10. In FIG. 3, a path indicated by an alternate long and short dashed line denotes a command path (a normative path C) which is given as a normative command, and refers to a "target position Pi (point sequence data) for each control cycle." A normative path C is a path given in advance on the basis of design data of a workpiece or the like and is a "default normative path."

On the other hand, a path indicated by a solid line denotes a path (a required path) required for an actual object (an actual workpiece). The shape of an actual workpiece may not completely match the shape indicated by the design data of the workpiece.

Therefore, the PLC 10 generates a corrected path C' which is obtained by correcting the normative path C so that a difference between the normative path C and the required path decreases using a captured image of the actual object. In FIG. 3, a path indicated by an alternate long and two short dashed line is a path obtained by causing the PLC 10 to correct the normative path C on the basis of the shape of the actual object, that is, a corrected path C' generated by the PLC 10. For example, the PLC 10 corrects "normative paths Ci of m cycles" and generates "corrected paths C'i of m cycles" as will be described below. That is, the PLC 10 corrects a normative path Ci and generates a corrected path C'i on the basis of a "correction target position (a required position of an actual object, for example, a feature point) which is detected on a captured image of a workpiece to correspond to a target position Pi of a normative path Ci m cycles before a current position during operation."

Although details thereof will be described later with reference to FIG. 4, "m" is an integer with which m times a control cycle Tc [ms] of the PLC 10 is greater than two times a time (an image processing cycle Tp [ms]) required from "capturing of an image" to "acquiring of a measurement result at a desired position (for example, a target position)." That is, "m" is an integer satisfying "Tc×m>2Tp." In other words, "m" may be defined as "m=2k" using k cycles which are greater than a time Tp [ms] required for processing an image, that is, an integer "k" satisfying "Tc×k>Tp."

Figure 4:
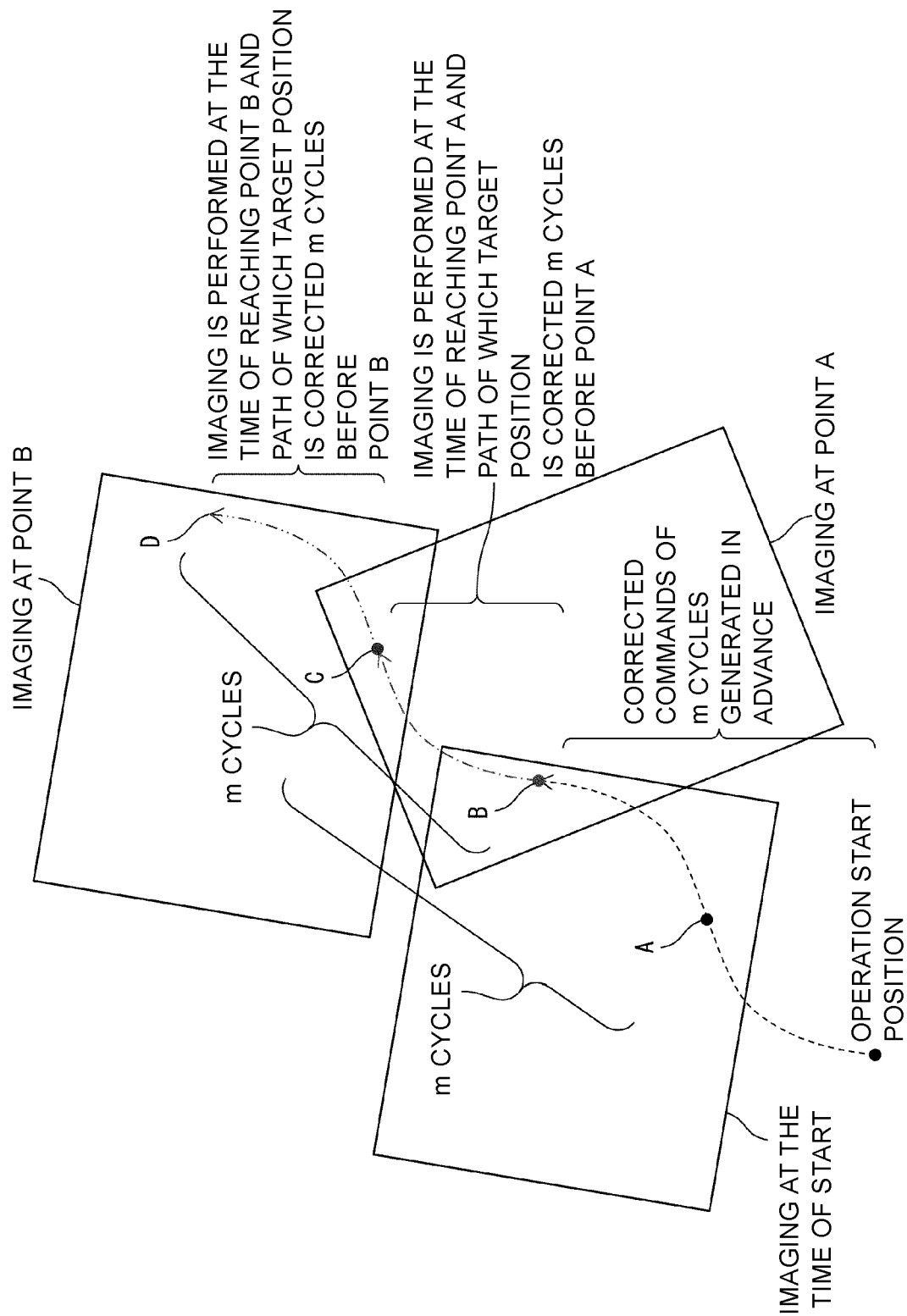
FIG. 4 is a diagram illustrating details of an example of the method of generating a corrected path which is performed by the PLC illustrated in FIG. 1.

FIG. 4 is a diagram illustrating details of an example of a method of generating a corrected path C'i which is performed by the PLC 10. In general, the image processing cycle Tp [ms] which is a period (a processing time) required for image processing is greater than a processing cycle in path control (that is, the control cycle Tc [ms]). Accordingly, the PLC 10 corrects a target position Pi m cycles before which are greater than two times the image processing cycle Tp [ms] of the image processing device (for example, the time required from "capturing of an image" to "acquiring of a measurement result at a desired position"). Accordingly, the PLC 10 corrects a target position using captured images every m/2 cycle, that is, k cycles, and interpolates values therebetween on the basis of a default normative path (specifically, the generated corrected path C'i), thereby realizing an uninterrupted continuous operation.

In FIG. 4, point A indicates a "part corresponding to a target position P'i (a destination) of the corrected path C'i m/2 cycles before, that is, k cycles before, from an operation start position (a time point before an operation is started) of a workpiece." In other words, point A indicates an "area around the target position P'i of the corrected path C'i k cycles before the operation start position" of the workpiece.

Although details thereof will be described later, the target position P'i of the corrected path C'i of the (i+1)-th control cycle is obtained by correcting a target position Px of a normative path Cx of one control cycle of the i-th, (i+1)-th, and (i+2)-th control cycles. Accordingly, point A may be defined as a "part corresponding to the target position Px (a destination) of the normative path Cx k cycles before, k+1 cycles before, or k+2 cycles from the operation start position."

In FIG. 4, point B indicates a "part corresponding to the target position P'i of the corrected path C'i m cycles before the operation start position (a time point before the operation is started)" of the workpiece. In other words, point B indicates a "part corresponding to the target position P'i of the corrected path C'i m/2 cycles before point A (more accurately, the control cycle in which the dispenser 40 reaches point A) of the workpiece. Similarly, point C indicates a "part corresponding to the target position P'i of the corrected path C'i m cycles before point A (more accurately, the control cycle in which the dispenser 40 reaches point A)" of the workpiece. In other words, point C indicates a "part corresponding to the target position P'i of the corrected path C'i m/2 cycles before point B (more accurately, the control cycle in which the dispenser 40 reaches point B) of the workpiece. Point D indicates a "part corresponding to the target position P'i of the corrected path C'i m cycles before point B (more accurately, the control cycle in which the dispenser 40 reaches point B)" of the workpiece. In other words, point D indicates a "part corresponding to the target position P'i of the corrected path C'i m/2 cycles before point C (more accurately, the control cycle in which the dispenser 40 reaches point C) of the workpiece.

In the example illustrated in FIG. 4, (1) the PLC 10 generates the corrected paths C'i corresponding to m cycles in advance at the time of starting of the operation. That is, the PLC 10 generates corrected paths C'i corresponding to m cycles in advance at a time point at which position control of the dispenser 40 by the servo driver 20 is started and the dispenser 40 is located at the operation start position (a position at which a low-speed control operation is started).

Specifically, the PLC 10 generates the corrected paths C'i corresponding to m cycles in advance at the time of starting of the operation using the imaging result of an "area including point B of the workpiece" which has been imaged in advance by the camera 60. In FIG. 4, the curve indicated by a dotted line represents the corrected paths C'i corresponding to m cycles which have been generated in advance before the PLC 10 starts its operation.

(2) At a time point at which the dispenser 40 reaches point A (at the time of reaching point A), the PLC 10 causes the camera 60 to image a "part/area including point C (a part corresponding to the target position P'i of the corrected path C'i m cycles before point A) of the workpiece" via the image processing device 50. As defined above, "m/2 times the control cycle Tc is larger than the image processing cycle Tp." Accordingly, the PLC 10 acquires the imaging result of an "area including point C" which has been imaged by the camera 60 at the time of reaching point A at a time point before a time point (at the time of reaching point B) at which the dispenser 40 reaches point B (a position corresponding to the target position P'i of the corrected path C'i m/2 cycles before point A). In other words, the PLC 10 acquires the imaging result of the "area including point C" at a time point earlier than the time of reaching point B.

Here, a processing time associated with "generation of a corrected path by correcting a normative path using an image processing result" by the PLC 10 has a length which is sufficiently small and ignorable. Accordingly, the PLC 10 generates the corrected path C'i m cycles before the time of reaching point A using the imaging result of the "area including point C" at the time of reaching point B.

That is, PLC 10 causes the camera 60 to image an "area including point C of the workpiece" at the time of reaching point A, and generates a corrected path C'i m cycles before the time of reaching point A using the imaging result at the time of reaching point B, that is, generates a path for correcting a target position m cycles before point A.

(3) At a time point at which the dispenser 40 has reached point B (at the time of reaching point B), the PLC 10 causes the camera 60 to image a "part/area including point D (a part corresponding to a target position of a corrected path in cycles before point B) of the workpiece" via the image processing device 50. The PLC 10 acquires an imaging result of an "area including point D" which has been imaged by the camera 60 at the time of reaching point B at a time point before a time point (the time of reaching point C) at which the dispenser 40 reaches point C (a position corresponding to the target position P'i of the corrected path C'i m/2 cycles before point B). Accordingly, the PLC 10 generates the corrected path C'i m cycles before the time of reaching point B using the imaging result of the "area including point D" at the time of reaching point C.

That is, PLC 10 causes the camera 60 to image an "area including point D of the workpiece" at the time of reaching point B, and generates a corrected path C'i m cycles before the time of reaching point B using the imaging result at the time of reaching point C, that is, generates a path for correcting a target position m cycles before point B.

(Outline of Process Performed by PLC 10)

Figure 5:
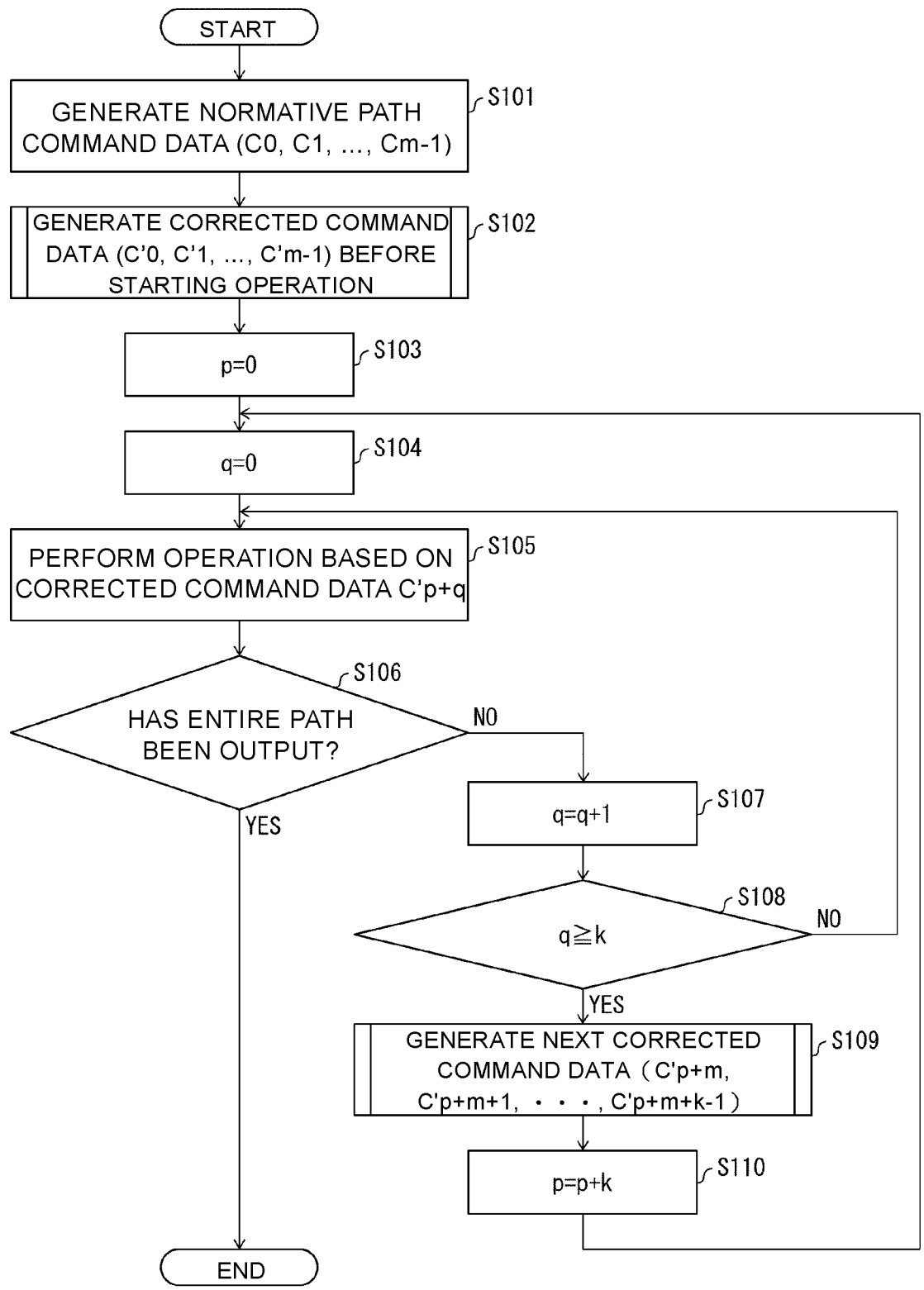
FIG. 5 is a flowchart illustrating an outline of a process flow which is performed by the PLC illustrated in FIG. 1.

FIG. 5 is a flowchart illustrating the outline of a process flow which is performed by the PLC 10. As described above, the PLC 10 calculates k cycles which is larger than a time required for image processing (that is, an image processing cycle Tp) in advance before starting control of the dispenser 40. A target position which is corrected by the PLC 10 by acquiring an imaging result (particularly feature point information) from the camera 60 from the image processing device 50 is, for example, a target position P of a normative command (a normative path C) m cycles before where m satisfies m=2k.

The PLC 10 first generates path command data, that is, a normative path Ci (where i=0, . . . , m−1), serving as a norm for each control cycle from a normative path C (such as NC data) generated by a user or the like (S101).

The PLC 10 generates corrected command data, that is, corrected path C'i (where i=0, . . . , m−1), for each control cycle before starting an operation using the generated normative path Ci (where i=0, m−1) for each control cycle (S102). Details of the process of "generating the corrected path data before starting an operation" in S102 will be described later with reference to FIG. 6A.

The PLC 10 sets p=0 (S103), sets q=0 (S104), and performs an operation of corrected path data C'p+q (S105). That is, PLC 10 outputs corrected path data C'0 to the servo driver 20 and causes the servo driver 20 to perform control of the dispenser 40 (the servo motor 30) based on the corrected path data C'0.

The PLC 10 determines whether control of the entire path (that is, the normative path C generated by a user or the like), that is, outputting of the entire path, has ended (S106). The PLC 10 ends the process flow when it is determined that outputting of the entire path has ended (YES in S106).

When it is determined that outputting of the entire path has not ended (NO in S106), the PLC 10 counts up q by 1, that is, sets "q=q+1" (S107). Thereafter, the PLC 10 determines whether q is equal to or greater than, k, that is, whether q satisfies "q≥k" (S108).

When it is determined that q is less than k (NO in S108), the PLC 10 repeatedly performs the processes of S105 to S108. When it is determined that q is equal to or greater than k (YES in S108), the PLC 10 generates next corrected path data (C'p+m, C'p+m+1, . . . , C'p+m+k−1) (S109). Details of the process of "generating next corrected path data" in S109 will be described later with reference to FIG. 6B.

After the process of S109 has been performed, the PLC 10 counts up p by k, that is, sets "p=p+k" (S110), and repeatedly performs the processes from S104 to S109 until outputting of the entire path has ended (YES in S106).

Figures 6A, 6B:
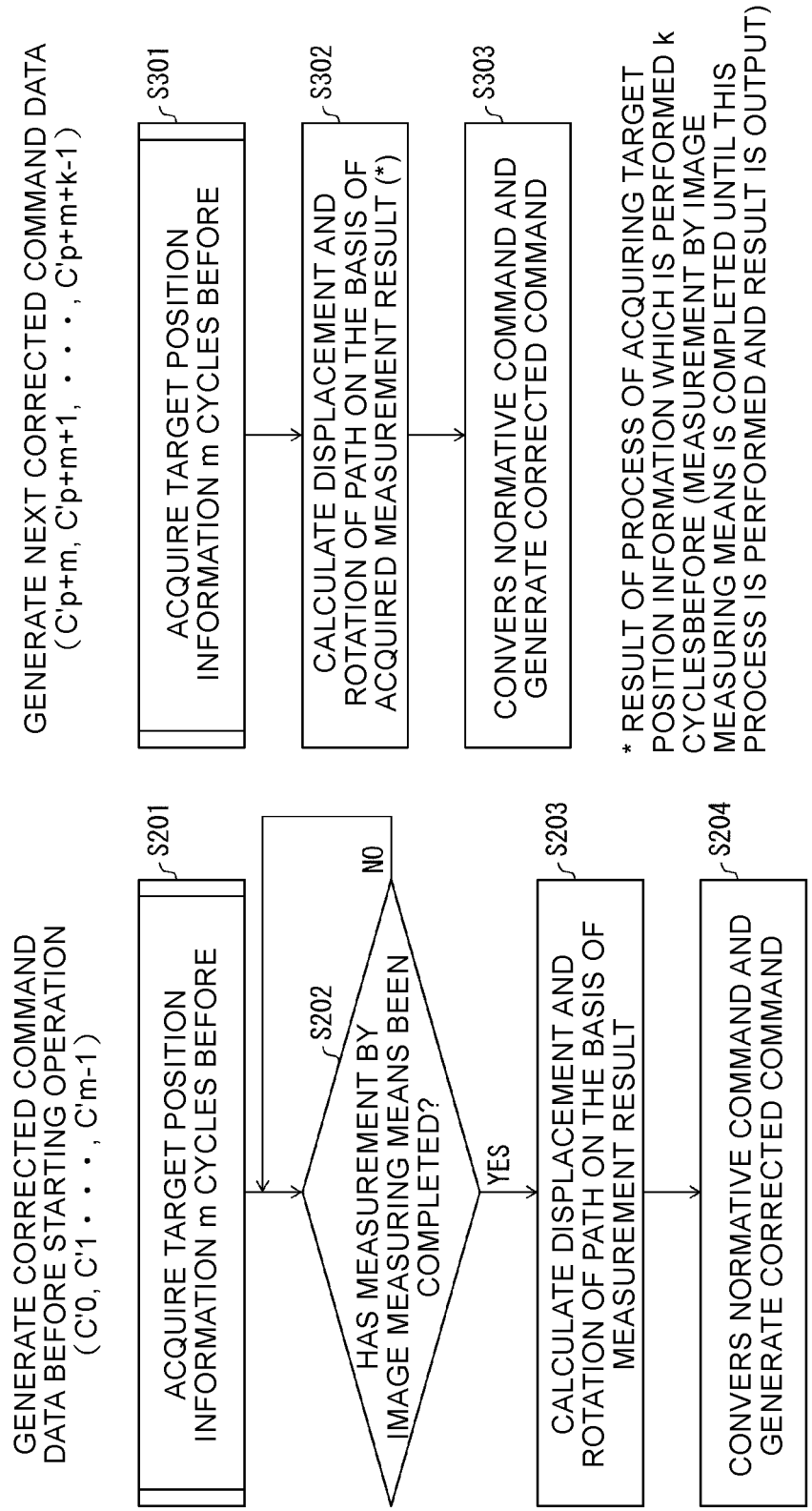
FIG. 6A and FIG. 6B are flowcharts illustrating details of a process of "generating corrected command data" in S102 and S109 in FIG. 5.

FIG. 6A and FIG. 6B are flowcharts illustrating details of the process of "generating corrected path data" in S102 and S109 in FIG. 5. FIG. 6A is a flowchart illustrating details of the process of "generating corrected path data (C'0, C'1, . . . , C'm−1) before starting an operation" in S102 of FIG. 5. FIG. 6B is a flowchart illustrating details of the process of "generating next corrected command data (C'p+m, C'p+m+1, . . . , C'p+m+k−1) before starting an operation" in S109 of FIG. 5.

As illustrated in FIG. 6A, in the process of "generating corrected path data before starting an operation" in S102 of FIG. 5, the PLC 10 instructs the image processing device 50 to acquire target position information m cycles before (that is, feature point information m cycles before) (S201). Details of the process of "acquiring target position information m cycles before" will be described later with reference to FIG. 7.

The PLC 10 determines whether measurement by image measuring means (that is, the image processing device 50) (that is, a process of analyzing a captured image from the camera 60 by the image processing device 50) has been completed (S202). When it is determined that measurement by the image measuring means has not been completed (NO in S202), the PLC 10 repeatedly performs this determination until it is determined that measurement by the image measuring means has been completed.

The "measurement by the image measuring means" is, for example, a process of "causing the image processing device 50 to analyze a captured image from the camera 60 and to calculate, for example, information indicating a shape/outline of a desired part of an actual object (specifically, information indicating a curve constituting an edge/boundary of a desired part)." Feature point information (target position information) output from the image processing device 50 to the PLC 10 may include a process result (a measurement result) of the "measurement by the image measuring means," that is, "information indicating a curve or the like constituting an edge/boundary of a desired part."

When it is determined that measurement by the image measuring means has been completed (YES in S202), the PLC 10 acquires the measurement result (that is, feature point information corresponding to a target position m cycles before) from the image measuring means and calculates displacement and rotation of a path on the basis of the acquired measurement result (S203).

Then, the PLC 10 converts a normative path using the calculated displacement and rotation and generates a corrected path (S204).

As illustrated in FIG. 6B, in the process of "generating next corrected command data" in S109 of FIG. 5, the PLC 10 instructs the image processing device 50 to acquire target position information (feature point information) m cycles before (S301). Details of the process of "acquiring target position information m cycles before" will be described later with reference to FIG. 7.

The PLC 10 calculates displacement and rotation of a path on the basis of the "acquired measurement result (that is, the target position information (feature point information) which the image measuring means has been instructed to acquire in S301 k cycles before)" (S302). Here, the "acquired measurement result" is a "measurement result for an imaging result of a target position/part of an actual object (a range designated by range designation) of which execution has been instructed k cycles before," that is, feature point information which is results of imaging and analysis processes of which execution has been instructed k cycles before.

As described above with reference to FIG. 4 or the like, the PLC 10 acquires a measurement result (that is, feature point information) of a "part corresponding to a target position Pi m cycles (2k cycles) before" of a workpiece which the camera 60 (the image processing device 50) has been instructed to image k cycles after the instruction. Until the PLC 10 performs the process of S302, "measurement by the image measuring means (acquisition of target position information m cycles before)" which the PLC 10 has instructed the image processing device 50 in S301 k cycles before is completed. Then, the image processing device 50 outputs the measurement result (the target position information, that is, the feature point information) to the PLC 10, and the PLC 10 acquires the measurement result before S302 is performed k cycles after the instruction in S301. That is, the PLC 10 acquires the result of the process of "acquiring target position information m cycles before" which the PLC 10 has been instructed the image processing device 50 in S301 before S302 k cycles after the instruction, and performs S302 using the acquired measurement result in S302 k cycles after the instruction.

The PLC 10 converts (that is, corrects) the normative path Ci using the displacement and rotation calculated in S302 and generates the corrected path C'i (S303).

Figure 7:
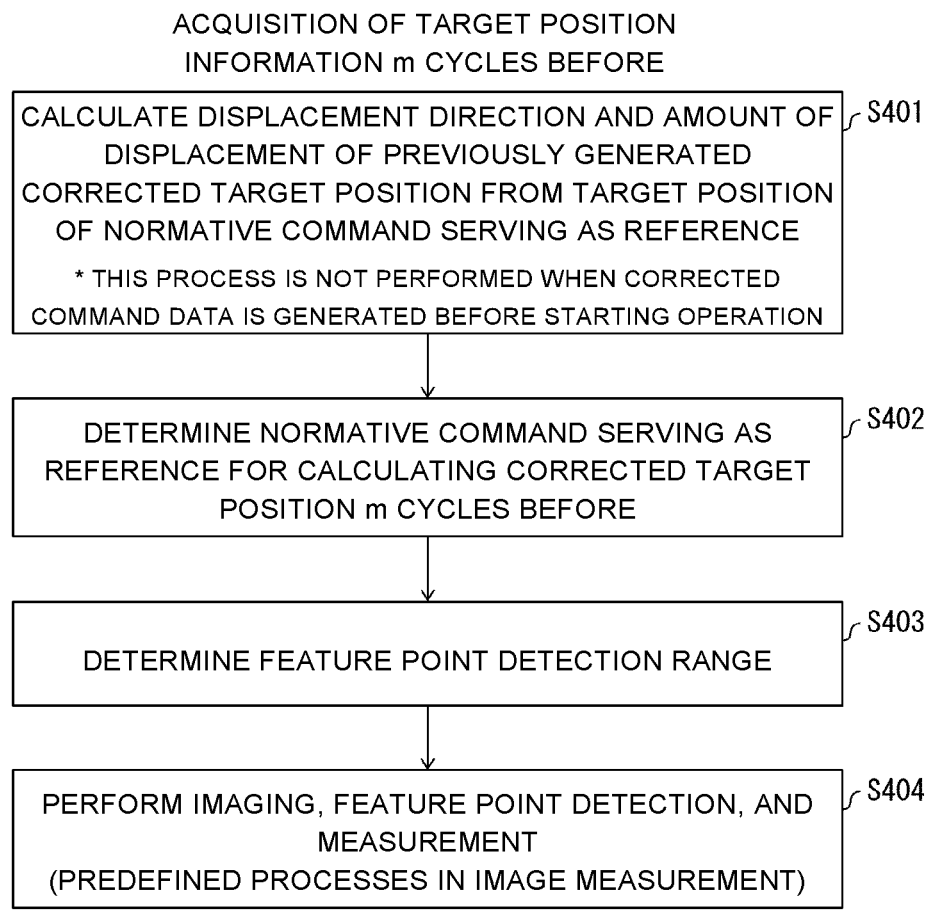
FIG. 7 is a flowchart illustrating details of a process (S201 and S301) of "acquiring target position information m cycles before" in FIG. 6A and FIG. 6B.

FIG. 7 is a flowchart illustrating details of the process (S201 and S301) of "acquiring target position information m cycles before" in FIG. 6A and FIG. 6B. As illustrated in FIG. 7, the PLC 10 first calculates a displacement direction and an amount of displacement of a target position P'i of the corrected path C'i which has been generated in a previous cycle from the target position Pi of the normative path Ci based on the corrected path C'i (S401). The PLC 10 does not perform the process of S401 in the process of "acquiring target position information m cycles before" in S201 of FIG. 6A. That is, the PLC 10 does not perform the process of S401 at the time of generating the corrected path data before starting the operation.

The PLC 10 determines a normative path Ci serving as a reference for calculating a target position P'i of the corrected path C'i m cycles before using the calculated displacement direction and the calculated amount of displacement (S402). Details of the process of "determining a normative path" will be described later with reference to FIGS. 11A to 13.

The PLC 10 determines a feature point detection range using the determined normative path (S403) and outputs the determined feature point detection range as a "range designation" to the image processing device 50. The PLC 10 causes the camera 60 to image the determined feature point detection range via the image processing device 50, and cause the image processing device 50 to detect feature points (an edge/boundary indicating a shape of the feature point detection range of the workpiece) from the imaging result from the camera 60. The PLC 10 may cause the image processing device 50 to measure coordinates of feature points or the like. That is, the PLC 10 causes the image processing device 50 and the camera 60 to perform the processes such as "imaging, feature point detection, and measurement" (S404). The processes such as "imaging, feature point detection, and measurement" are predefined processes of the image measuring means (the image processing device 50 and the camera 60). That is, the processes such as "imaging, feature point detection, and measurement" can be embodied using processes of "imaging a specific part of an imaging object, detecting a feature point such as an edge/boundary indicating the shape of the specific part from the captured image, and measuring coordinates of the detected feature points or the like" in the related art.

*3. Example of Operation

For the purpose of easy understanding of the PLC 10, an example in which the PLC 10 generates a two-dimensional arc-shaped path will be described below with reference to FIGS. 8A to 14C. In the following description, for the purpose of simplification, it is assumed that processes from "imaging of an image" to "extraction of a feature point and acquisition of a measurement result" are completed within one control cycle. That is, "k=1" and "m=2" are assumed in the flows which have been described above with reference to FIGS. 5 to 7.

1. Preparation 1.1. Generation of Normative Path Data

In an example of control of the PLC 10 which will be described with reference to FIGS. 8A to 14C, it is assumed that movement data (path data) for each control cycle includes in data pieces of normative paths Ci (where i=0, 1, 2, . . . , m−1). Here, "m" does not have to be a definite value, and a normative path may be generated and updated every time as long as path data required for control performed by the PLC 10 is ensured in a data buffer (a storage part 170) of the PLC 10 or the like.

Each normative path Ci (where i=0, 1, 2, . . . , m−1) includes n movement elements of "Ci={dx1($i$), dx2($i$), dx3($i$), . . . , dxn(i)}" for a path in an n-dimensional coordinate system. For example, when the path is an arc in the two-dimensional coordinate system, the normative path Ci includes two-dimensional elements (dx(i), dy(i)).

Figure 8A:
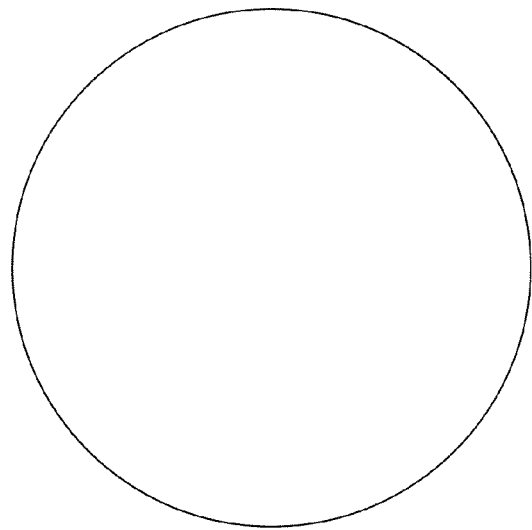
FIG. 8A to FIG. 8C are diagrams illustrating an example of a target path which the PLC illustrated in FIG. 1 intends to realize.
Figure 8B:
Figure 8C:
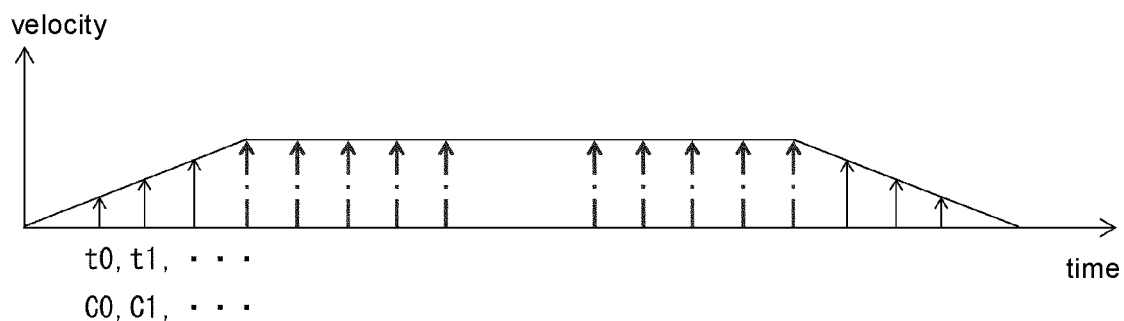

FIG. 8A to FIG. 8C illustrate an example of a normative path C (FIG. 8A) which is implemented by the PLC 10, a normative path Ci for each control cycle (FIG. 8B) for implementing the normative path C, and a speed for each control cycle in the normative path Ci for each control cycle (FIG. 8C). As illustrated in FIG. 8A to FIG. 8C, the PLC 10 implements, for example, a two-dimensional arc using m constant-speed normative paths Ci (normative paths Ci in which a speed is constant in control cycles).

1.2. Generation of First and Next Corrected Commands (Before Starting Operation)

The PLC 10 generates corrected paths C'i corresponding to m cycles in advance before starting an operation, that is, generates a corrected path C'i (where i=0, . . . , m−1) for each control cycle using a normative path Ci (where i=0, . . . , m−1) for each control cycle. Since "m=2" is set as described above, the PLC 10 generates corrected paths C'0 and C'1 for normative paths C0 and C1 in advance before starting the operation. The PLC 10 generates the corrected paths C'0 and C'1 from the normative paths C0 and C1, for example, using the method illustrated in FIG. 9A and FIG. 9B.

Figure 9A:
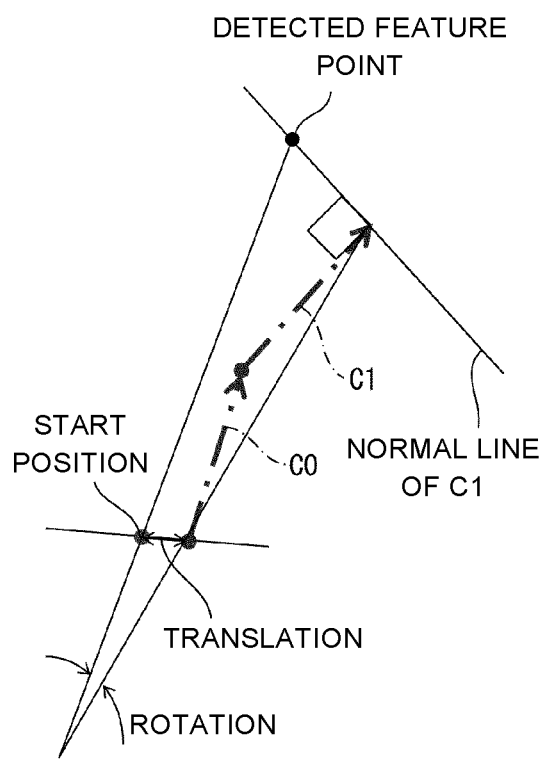
FIG. 9A and FIG. 9B are diagrams illustrating an example of a method of generating a corrected command which is performed by the PLC illustrated in FIG. 1.
Figure 9B:
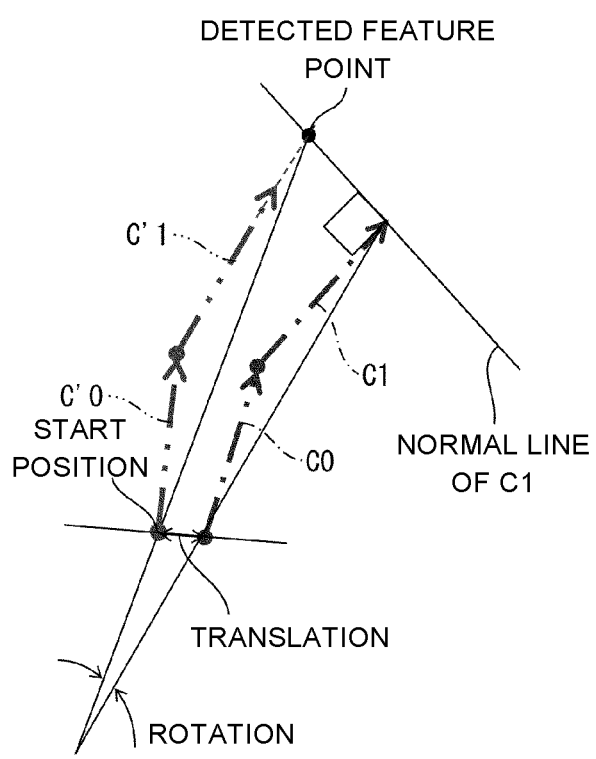

FIG. 9A and FIG. 9B illustrate an example of a method of generating the corrected paths C'0 and C'1 from the normative paths C0 and C1 which is performed by the PLC 10. As illustrated in FIG. 9A and FIG. 9B, (1) the image processing device 50 detects a feature point in the normal line of the normative path C1 in an image captured by the camera 60 before the PLC 10 starts the operation thereof (in a stopped state). The image processing device 50 notifies the PLC 10 of information (feature point information) such as coordinates of the detected feature point.

(2) The PLC 10 calculates an "amount of rotation (a slope)" and an "amount of translation (a displacement)" for a "line connecting a start point of the normative path C0 and an end point (a target position) of the normative path C1" and a "line connecting a start position (an initial position) and a detected feature point." That is, the PLC 10 calculates an "amount of rotation (a slope)" required for causing the "line connecting a start point of the normative path C0 and an end point of the normative path C1" to be parallel to the "line connecting a start position (an initial position) and a detected feature point." The PLC 10 calculates an "amount of translation (a displacement)" which is an amount by which the start point of the normative path C0 moves to the start position (the initial position) (FIG. 9A).

Here, detection of a "feature point of an actual object (an actual workpiece)" corresponding to the "target position (the end point) of the normative path C1" is not limited to detection in the normal line of the normative path C1. For example, a "feature point of an actual object (an actual workpiece)" corresponding to the "target position (the end point) of the normative path C1" may be determined in a line with a shortest line when a perpendicular line has been drawn with respect to an outline of the actual object. For example, a "feature point of an actual object (an actual workpiece)" corresponding to the "target position of the normative path C1" may be detected in a specific area surrounding the target position of the normative path C1. Specifically, a "feature point of an actual object (an actual workpiece)" may be determined from a specific pattern which is detected in a circular area centered on the target position, or the like.

(3) The PLC 10 generates the corrected paths C'0 and C'1 to which the normative paths C0 and C1 are converted (that is, corrected) using the amount of rotation and the amount of translation calculated in (2).

In the example illustrated in FIG. 9A and FIG. 9B, the PLC 10 generates the corrected path C'i using the amount of rotation (the slope) and the amount of translation (the displacement) with respect to a "line connecting a start point and an end point" in each of a normative command (the normative path Ci) and a corrected command (a corrected path C'i). That is, the "line connecting a start point of the normative path C0 and an end point of the normative path C1" is a "line connecting a start point and an end point of a normative command (the normative path Ci)." The "line connecting a start position (an initial position) and a detected feature point" is a "line connecting a start point and an end point of a corrected command (a corrected path C')." In the example illustrated in FIG. 9A and FIG. 9B, the PLC 10 generates the corrected path C'i using rotation and translation from the "line connecting a start point and an end point of a normative command" to a "line connecting a start point and an end point of a corrected command." However, the method of generating the corrected paths C'0 and C'1 which is performed by the PLC 10 is not limited to the method illustrated in FIG. 9A and FIG. 9B.

Figure 10A:
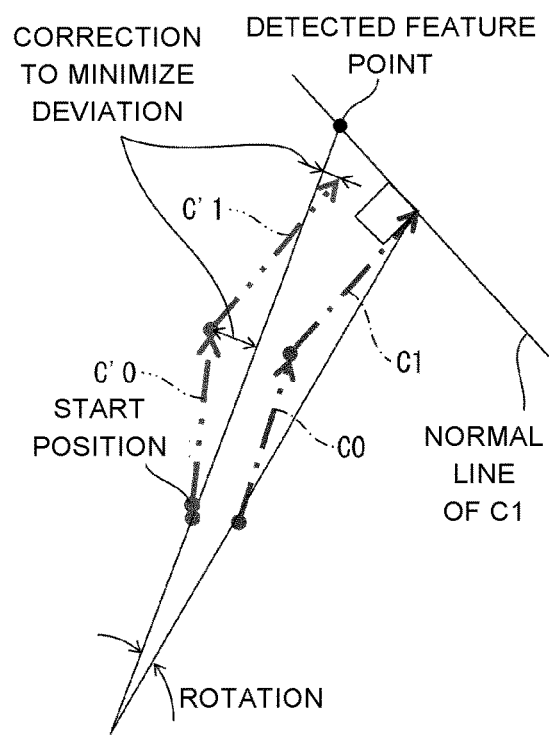
FIG. 10A and FIG. 10B are diagrams illustrating a method of generating a corrected command which is performed by the PLC illustrated in FIG. 1, which is different from the method illustrated in FIG. 9.
Figure 10B:
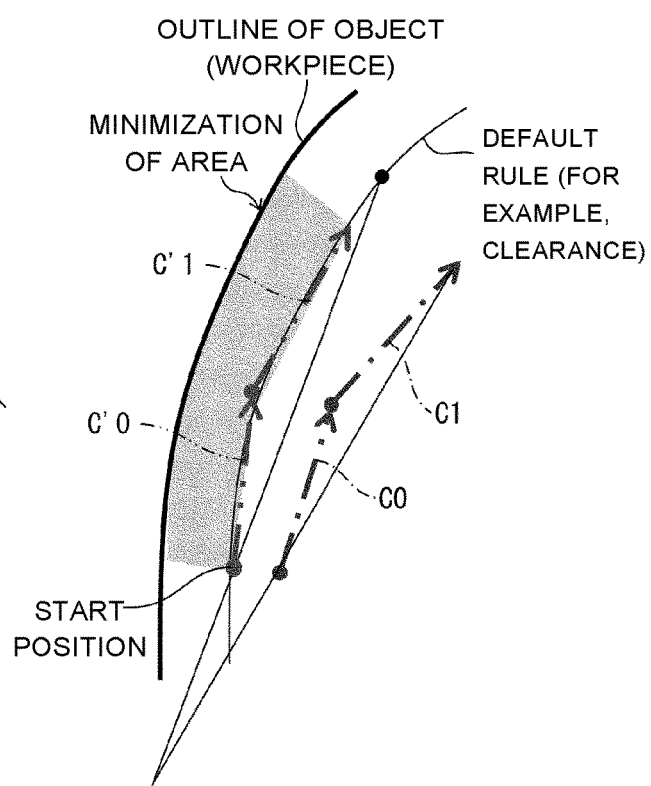

FIG. 10A and FIG. 10B illustrates a method of generating the corrected paths C'0 and C'1 from the normative paths C0 and C1 which is performed by the PLC 10 and which is other than the method illustrated in FIG. 9A and FIG. 9B. For example, as illustrated in FIG. 10A, the PLC 10 may calculate a slope of which a deviation is minimized with respect to a "line passing through a start point (an initial position) of a corrected command and a detected feature point" using a least square method. As illustrated in FIG. 10B, the PLC 10 may select a corrected path in which an area surrounded by the corrected path and the outline of an actual object is minimized from a group of "corrected paths" satisfying a predetermined rule (such as a clearance) for an outline of an object.

2. Start of Operation Based on Corrected Command C'0

The PLC 10 outputs a corrected path C'0 which has been generated in advance to the servo driver 20, and causes the servo driver 20 to perform control of the servo motor 30 (that is, the dispenser 40) based on the corrected path C'0.

3. Generation of Corrected Command C'2 at the Time of End of Operation Based on Corrected Command C'0

The PLC 10 generates a corrected command C'2 by performing the processes of from "3.1." to "3.3." at the time point of end of an operation based on the corrected command C'0. The "time point of end of an operation based on the corrected path C'0" is a "time point of start of an operation based on the corrected path C'1," that is, a "time point at which the dispenser 40 is located at P'0 which is an end point of the corrected path C'0."

3.1. Determination of Normative Command Ci Serving as Reference (Reference Source) (Determination of Selection)

The PLC 10 determines with respect to which normative path Cx to "generate a corrected path C'i of a next control cycle (specifically, a control cycle m cycles before), that is, a corrected path C'i of a control cycle m cycles before a control cycle at which the dispenser 40 has reached a current position" as follows. That is, this determination is performed using a "target position P'i (a destination) of the previously generated corrected path C'i" and a "target position Pi of a normative path Ci serving as a reference for the previously generated corrected path C'i." The control cycle of the previously generated corrected path C'i is not limited to the same as the control cycle of the normative path Ci serving as a reference for the corrected path C'i.

For example, the PLC 10 determines a normative path Cx serving as a basis of the corrected path C'2 from the relationship between the "target position P'1 of the corrected path C'1" and the "target position P1 of the normative path C1 serving as a reference for the corrected path C'1" at the time point at which the current position of the "dispenser 40 is P'0."

The PLC 10 generates a normative path Cx serving as a basis of the corrected path C'2 from the relationship between the "target position P'1 of the corrected path C'1" and the "target position P1 of the normative path C1" using the method illustrated in FIGS. 11A to 13.

In FIGS. 11A to 13, a method of determining (selecting) a normative path serving as a basis of the corrected path C'2 on the basis of the positional relationship between the "target position P'1 of the corrected path C'1" and the "target position P1 of the normative path C1" and a distance therebetween which is performed by the PLC 10 is illustrated. However, the method of selecting a normative path serving as a basis of the corrected path C'2 from the relationship between the "target position P'1 of the corrected path C'1" and the "target position P1 of the normative path C1" which is performed by the PLC 10 is not limited to the method illustrated in FIGS. 11A to 13. For example, the PLC 10 may select a "normative path command with a shortest distance from the target position P'1" as the "normative path serving as a basis of the corrected path C'2."

Figure 11A:
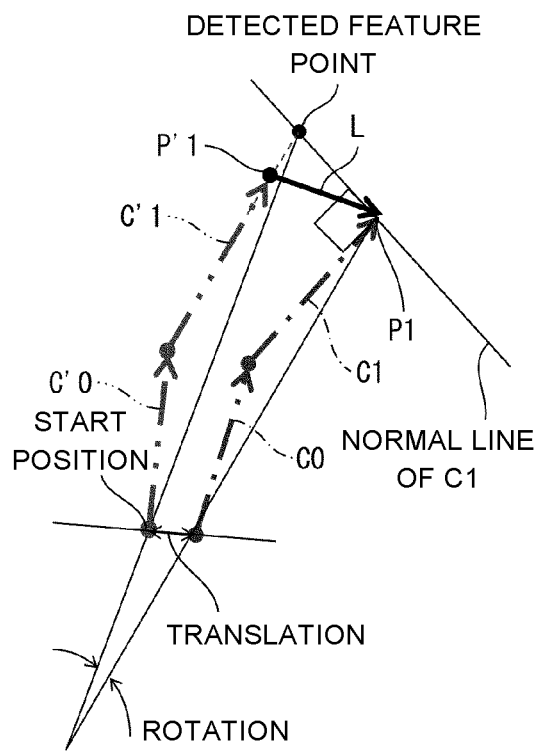
FIG. 11A to FIG. 11C are diagrams illustrating an example of a method of selecting a normative command serving as a basis of a corrected command which is performed by the PLC illustrated in FIG. 1.
Figure 11B:
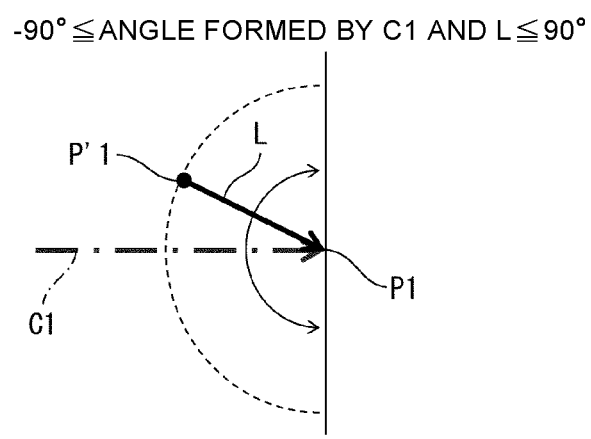
Figure 11C:
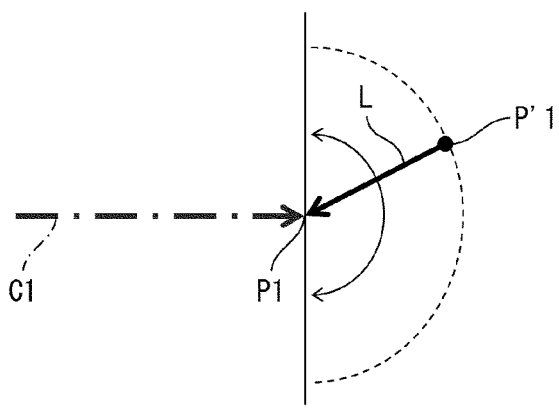

FIG. 11A to FIG. 11C is a diagram illustrating an example of the method of selecting a normative path Cx serving as a basis of the corrected path C'2 from the relationship between the "target position P'1 of the corrected path C'1" and the "target position P1 of the normative path C1" which is performed by the PLC 10. As illustrated in FIG. 11A, (1) the PLC 10 first calculates a vector L from the target position P'1 to the target position P1. Then, (2) the PLC 10 determines whether the target position P'1 of the corrected path C'1 "lags behind" or "advances after" the original command position (the target position of the normative path C1) P1 from the "direction of L."

Figure 12A:
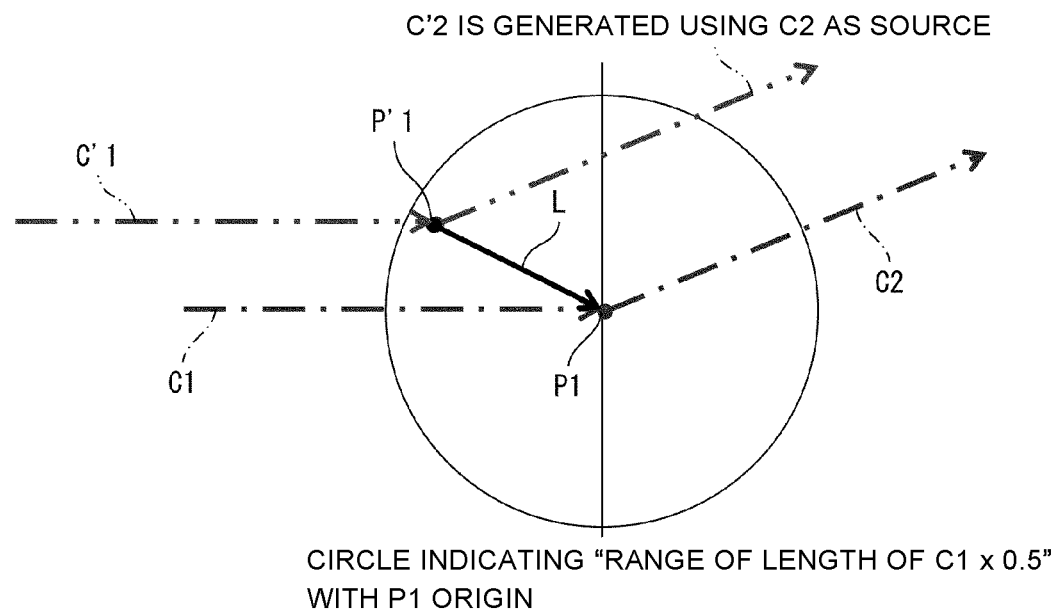
FIG. 12A and FIG. 12B are diagrams subsequent to FIG. 11A and FIG. 11B illustrating an example of the method of selecting a normative command serving as a basis of a corrected command which is performed by the PLC illustrated in FIG. 1.
Figure 12B:
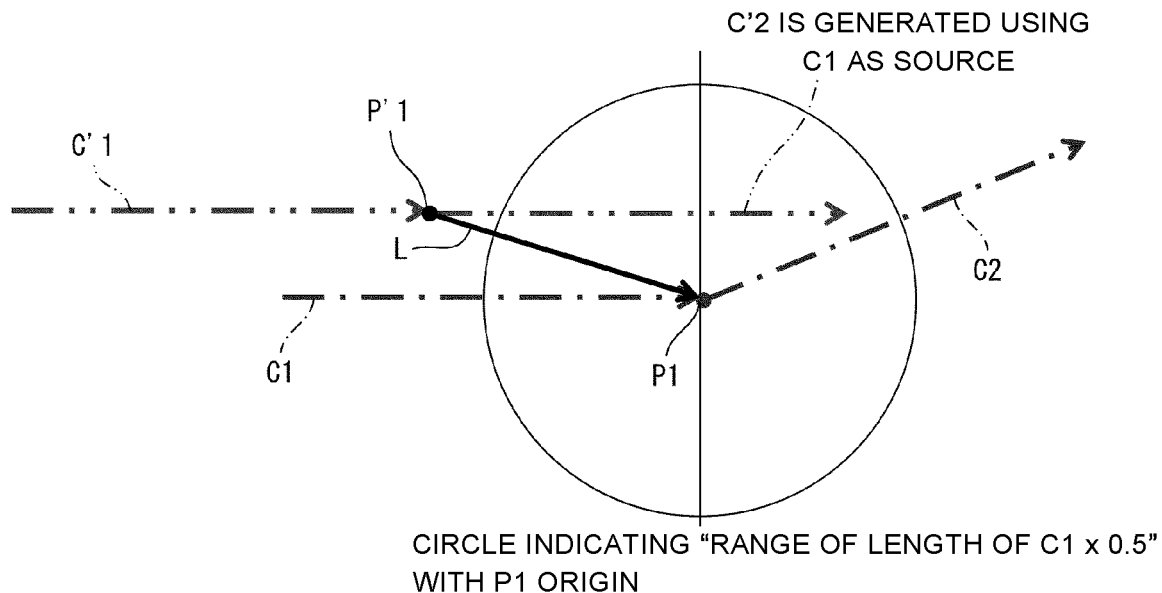

FIG. 12A and FIG. 12B are diagrams illustrating an example of the method of selecting the normative path Cx serving as a basis of the corrected path C'2 from the relationship between the "target position P'1 of the corrected path C'1" and the "target position P1 of the normative path C1" which is performed by the PLC 10 and which is subsequent to FIG. 11A to FIG. 11C.

Figure 13:
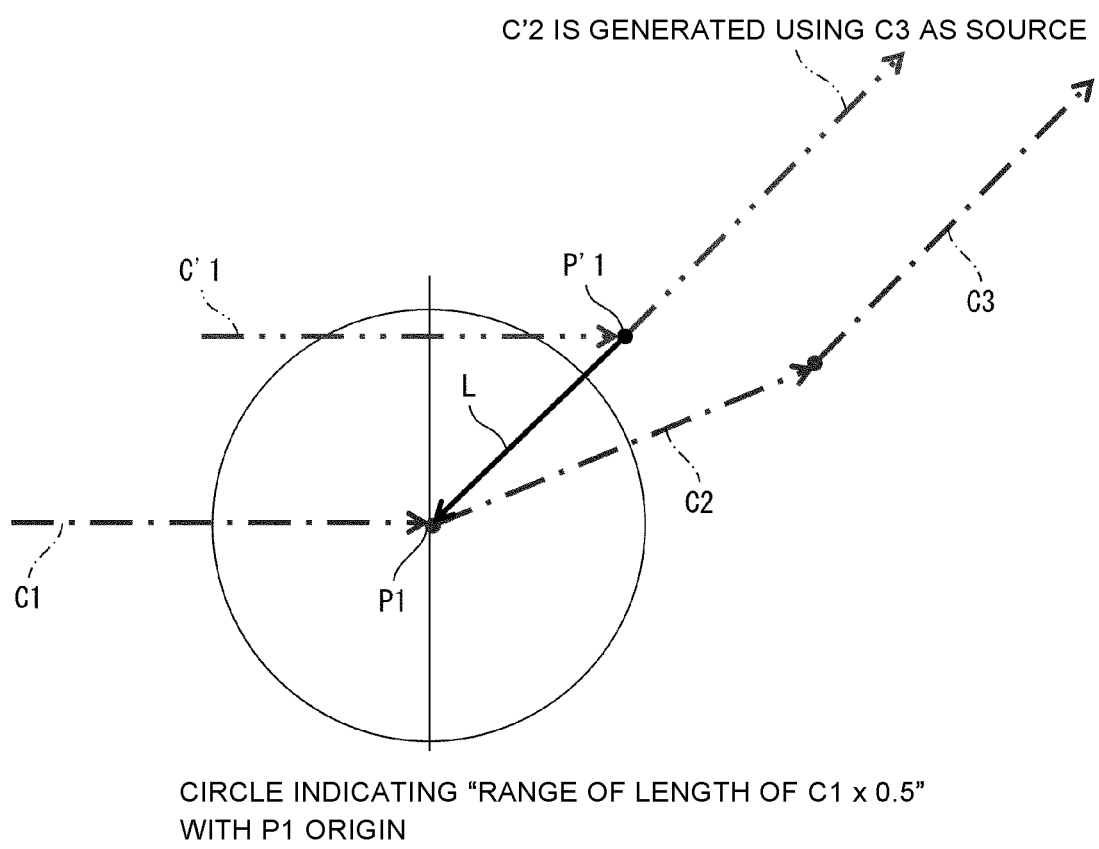
FIG. 13 is a diagram subsequent to FIG. 12A and FIG. 12B illustrating an example of the method of selecting a normative command serving as a basis of a corrected command which is performed by the PLC illustrated in FIG. 1.

FIG. 13 is a diagram illustrating an example of the method of selecting the normative path Cx serving as a basis of the corrected path C'2 from the relationship between the "target position P'1 of the corrected path C'1" and the "target position P1 of the normative path C1" which is performed by the PLC 10 and which is subsequent to FIG. 12A and FIG. 12B.

When (2) the PLC 10 determines whether the target position P'1 "has not reached (lags behind)" or "advances after (leads)" the target position P1 from the "direction of L," the PLC 10 additionally performs the following process. That is, (3) the PLC 10 determines a normative path Cx which is referred to in the next cycle (a normative path Cx serving as a basis of the corrected path C'2) using the "length of L" in addition to the determination result of whether the corrected path C'i "lags" or "leads." When it is mentioned that the corrected path C'1 "lags," it means a state in which "the target position P'1 has not reached the position corresponding to the target position P1." When it is mentioned that "the corrected path C'1 "leads," it means a state in which "the target position P'1 is located at a position advancing after the position corresponding to the target position P1."

Firstly, when "the length of the vector L is equal to or less than half the length of the normative path C1," the PLC 10 uses the following normative path as an original command (the normative path Cx serving as a basis) of the corrected path C'2. That is, the PLC 10 uses a normative path C2 subsequent to the normative path C1 as the original command of the corrected path C'2 (FIG. 12A).

Secondly, when "the length of the vector L is longer than half the length of the normative path C1" or "the target position P'1 has not reached (lags behind) the target position P1," the PLC 10 uses the same normative path C1 as in the previous cycle as an original command of the corrected path C'2 (FIG. 12B).

Thirdly, when "the length of the vector L is longer than half the length of the normative path C1" or "the target position P'1 advances after (leads) the target position P1," the PLC 10 uses a normative path C3 two cycles after the normative path C1 as an original command of the corrected path C'2 (FIG. 13).

This process which is performed by the PLC 10 is performed using the knowledge that the outline of an actual workpiece substantially matches the path command (the normative path) serving as a norm and the direction of a vector of the outline is close to that of a vector of a close normative path.

3.2. Imaging Trigger (for Feature Point Information)

The PLC 10 gives a trigger for imaging and detecting a feature point for generating the corrected path C'2 along with a range designation to the image measuring means (the image processing device 50). The image processing device 50 having received the trigger along with the range designation causes the camera 60 to image (capture an image of) a desired part (a range designated in the range designation) of an actual object (an actual workpiece). The image processing device 50 detects a feature point by analyzing the captured image from the camera 60 and outputs information of the detected feature point (feature point information) to the PLC 10.

Here, the feature point information is, for example, information indicating a shape of the desired part (for example, information indicating a curve constituting an edge/boundary of the desired part) which is acquired by analyzing the captured image of the desired part of the actual object (the range designated in the range designation received from the PLC 10). However, the feature point information is not limited to information indicating the shape of the desired part of the actual object which is acquired by analyzing the captured image of the desired part of the actual object. The image processing device 50 instead of the PLC 10 may perform measurement of a feature point on the normal line (for example, the process of measuring coordinates of the feature point) and output the measurement result as feature point information to the PLC 10.

In this case, for example, the PLC 10 gives normal line information on the normative path serving as a reference which is determined in "3.1." to the image processing device 50. Thereafter, the PLC 10 gives a trigger for imaging, detection, and measurement along with the range designation to the image processing device 50.

The image processing device 50 having received the trigger causes the camera 60 to image a desired part of the actual object and detects a shape of the part (for example, a curve constituting an edge/boundary of the part) by analyzing the captured image from the camera 60. Then, for example, the image processing device 50 calculates a feature point as an intersection of the detected curve or the like and a line (a normal line) indicated by the normal line information acquired from the PLC 10 and measures coordinates of the calculated feature point or the like. That is, the image processing device 50 performs measurement of a feature point in the normal line using the analysis/detection result in the captured image from the camera 60 (a curve indicating the shape of the desired part of the actual object) and the normal line information acquired from the PLC 10. The image processing device 50 may output the coordinates of the feature point in the normal line or the like which is the measurement result as the feature point information to the PLC 10.

3.3. Generation of Corrected Command C'2

The PLC 10 generates the corrected path C'2 from the normative path Ci (where i=1, 2, or 3) serving as a source using the same method as in "1.2." That is, the PLC 10 determines a normative path Cb serving as a reference (a reference source) of the corrected path C'2 through the process of "3.1."

Figure 14A:
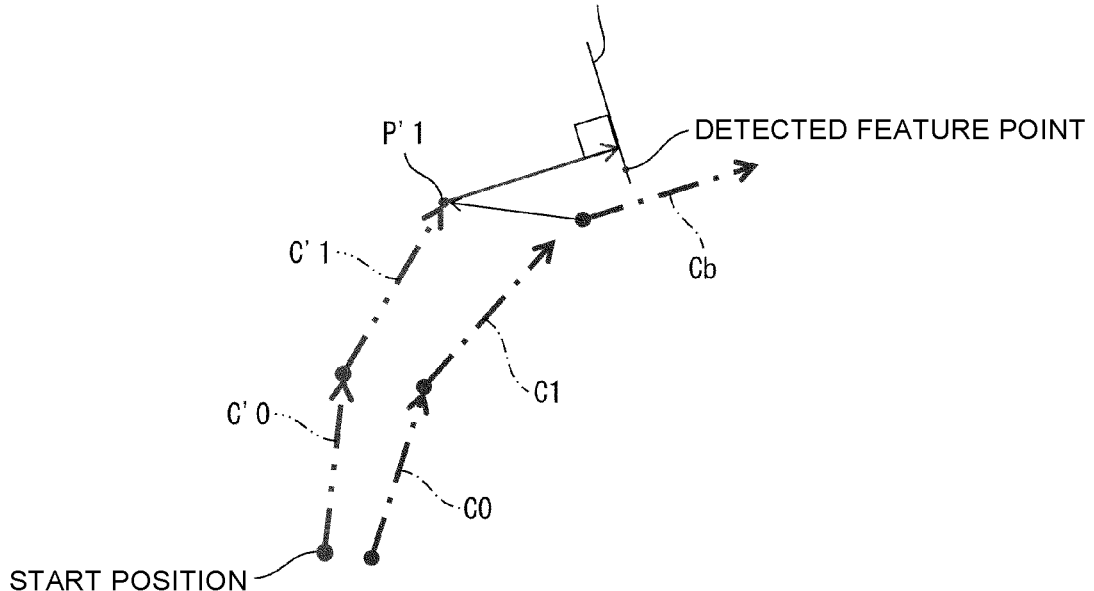
FIG. 14A to FIG. 14C are diagrams illustrating an example of a method of determining a normative command as a reference and correcting the determined normative command to generate a corrected command which is performed by the PLC illustrated in FIG. 1.
Figure 14B:
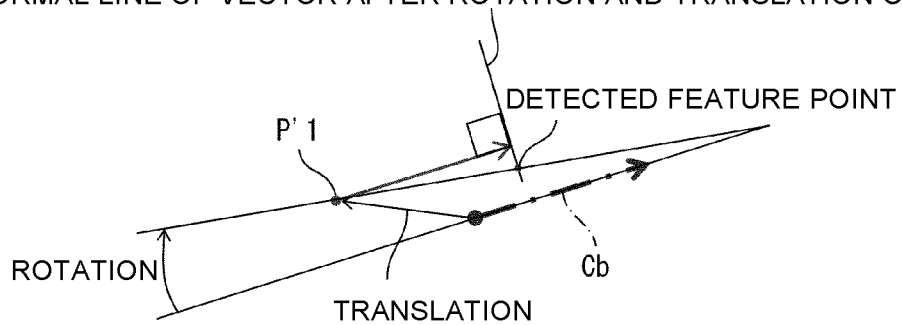
Figure 14C:
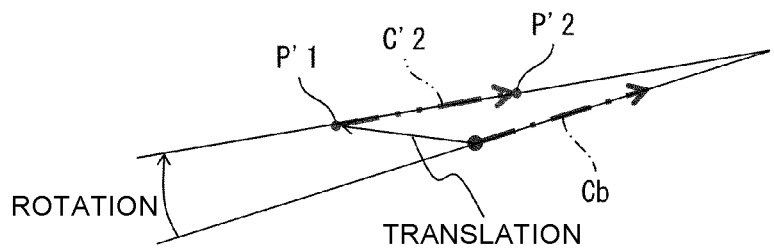

FIG. 14A to FIG. 14C are diagrams illustrating a method of generating the corrected path C'2 by correcting the normative path Cb after determining the normative path Cb serving as a reference of the corrected path C'2 which is performed by the PLC 10. (1) The PLC 10 connects the normative path Cb serving as a reference of the corrected path C'2 to the target position P'1 (that is, translates the normative path Cb so that the start point of the normative path Cb is the target position P'1) and detects a feature point on the normal line of the translated normative path Cb (FIG. 14A).

(2) The PLC 10 calculates an amount of rotation (a slope) and an amount of translation (a displacement) again from the "normative path Cb" and the "line connecting the target position P'1 to the detected feature point" (FIG. 14B). When "k>1" is satisfied, the PLC 10 calculates the amount of rotation (slope) and the amount of translation (displacement) from the "vector connecting a start point of Cb−k+1 to the target position (end point) of Cb" and the "line connecting the target position P'1 to the detected feature point."

(3) The PLC 10 generates the corrected path C'2 to which the normative path Cb is converted (that is, corrected) by the calculated rotation and translation (FIG. 14C). When "k>1" is satisfied, the PLC 10 converts the normative paths Cb−k+1 to Cb and generates k sets of corrected paths (k corrected paths).

4. Generation of Corrected Command C'3 at an Operation Ending Time Point Based on Corrected Command C'1

The PLC 10 generates a corrected path C'3 by performing the process of "3." at the time of ending of the operation based on the corrected path C'1. "The time point of ending of the operation based on the corrected path C'1" is an "operation starting time point based on the corrected path C'2," that is, a "time point at which the dispenser 40 is located at the end point P'1 of the corrected path C'1." Thereafter, the PLC 10 repeatedly performs the process of "3."

(Outline of Functional Configuration of Control Device)

The outline of the PLC 10 has been described hitherto with reference to FIGS. 2 to 14C. Details of the configuration and the process of the PLC 10 or the like will be described below in detail with reference to FIG. 1. Before describing details with reference to FIG. 1, the outline described hitherto will be concluded as follows for the purpose of easy understanding of the PLC 10.

The PLC 10 (the control device) is a control device that generates a corrected path C' which is obtained by correcting a normative command C (a target path) for the dispenser 40 (a control object) moving along a surface of a workpiece using an imaging result of the workpiece, and includes an acquisition part 110 configured to acquire a normative path Ci for each control cycle (a target path for each control cycle) and a correction part 120 (a generation part) configured to generate a corrected path C'i for each control cycle from the normative path Ci for each control cycle so that a length of the corrected path C'i for each control cycle substantially matches a length of the normative path Ci for each control cycle.

According to this configuration, the PLC 10 generates the corrected path C' by correcting the normative command C using the imaging result of the workpiece, and the length of the corrected path C'i for each control cycle substantially matches the length of the normative path Ci for each control cycle.

Accordingly, the PLC 10 can correct the normative command C for the dispenser 40 moving along the surface of the workpiece using the imaging result of the workpiece and keep a moving distance for each control cycle of the dispenser 40 constant.

The PLC 10 may further include a reference determining part 140 (a selection part) configured to select one target command of the normative path Cj of a (j+1)-th control cycle and the normative commands (for example, Cj−1 and Cj+1) of the control cycles before and after the (j+1)-th control cycle as the normative path Cx of the control cycle corresponding to the corrected path C'i of the (i+1)-th control cycle when a corrected path Ci−1 of an i-th control cycle is generated from the normative path Cj−1 of a j-th control cycle where i and j are integers equal to or greater than 1, and the correction part 120 may generate the corrected path C'i of the (i+1)-th control cycle from the normative path Cx of the control cycle selected by the reference determining part 140.

According to this configuration, the PLC 10 generates the corrected path C'i of the (i+1)-th control cycle from one normative path Cx selected from the normative path Cj of the (j+1)-th control cycle and the normative paths (for example, Cj−1 and Cj+1) of the control cycles before and after the (j+1)-th control cycle.

Here, the total distance (length) of the normative command C set on the basis of design data of the workpiece or the like may not match the total distance (length) of the corrected path C' generated on the basis of an actual shape of the workpiece. When the length in the normative command C does not match the length in the corrected path C' but the time interval and the execution frequency of the control cycle in which both paths are implemented are maintained, a moving distance of the dispenser 40 for each control cycle is different between the normative command C and the corrected path C'.

Therefore, the PLC 10 compensates for the difference in length between the normative command C and the corrected path C' while maintaining the moving distance of the dispenser 40 for each control cycle and the length of the control cycle by adjusting the execution frequency of the control cycle.

Specifically, the PLC 10 adjusts the execution frequency of the control cycle by generating the corrected path C'i of the (i+1)-th control cycle from one normative path Cx selected from the target path Cj of the (j+1)-th control cycle and the normative commands (for example, Cj−1 and Cj+1) of the control cycles before and after the (j+1)-th control cycle. For example, the PLC 10 adjusts the execution frequency of the control cycle by generating the corrected path C'i of the (i+1)-th control cycle from the normative path Cx of any one of the j-th, (j+1)-th, and (j+2)-th control cycles.

Accordingly, the PLC 10 can correct the normative command C using the imaging result of the workpiece and keep the moving distance of the dispenser 40 for each control cycle constant by adjusting the execution frequency of the control cycle.

The PLC 10 may further include an imaging result acquiring part 160 (a result acquiring part) configured to start acquisition of the imaging result corresponding to a target position P'i+2k−1 of the corrected path C'i+2k−1 of the (i+2k)-th control cycle repeatedly in k times the control cycle at the latest at a time point at which the dispenser 40 reaches the target position P'i−1 of the corrected path C'i−1 of the i-th control cycle where i is an integer equal to or greater than 1 and k is an integer with which k times the control cycle is larger than a time required from generation of the imaging result to acquisition of the imaging result, and the correction part 120 may generate the corrected paths C'i+k to C'i+2k−1 of the (i+k+1)-th to (i+2k)-th control cycles using the imaging result acquired by the imaging result acquiring part 160.

The "time required from generation of an imaging result to acquisition of the imaging result" specifically means a time required from "instruction of the image processing device 50 for imaging or the like" to "acquisition of feature point information" and includes a time required for "imaging of a "range designated in a range designation" of the workpiece by the camera 60." As described above, the PLC 10 gives the image processing device 50 an instruction for imaging, detecting of a feature point, and measuring along with the range designation. The image processing device 50 having received this instruction causes the camera 60 to image the "range designated in the range designation" of the workpiece, generates feature point information by performing analysis of the captured image of the "range designated in the range designation" from the camera 60, and outputs the generated feature point information to the PLC 10. The "time required from generation of an imaging result to acquisition of the imaging result" is a time required from "instruction of the image processing device 50 for imaging or the like" to "acquisition of feature point information from the image processing device 50" of the PLC 10 and includes a time required for "imaging of the "range designated in the range designation" by the camera 60."

According to this configuration, the PLC 10 starts acquisition of the imaging result corresponding to the target position P'i+2k−1 of the (i+2k)-th control cycle repeatedly in k times the control cycle at the latest at a time point at which the dispenser 40 reaches the target position P'i−1 of the i-th control cycle.

Here, k times the control cycle is larger than the time required from generation of the imaging result to acquisition of the imaging result. The PLC 10 starts acquisition of the "imaging result corresponding to the target position P'i+2k−1 of the (i+2k)-th control cycle (that is, the imaging result corresponding to the control cycle 2k control cycles before)" at the latest at the time point at which the dispenser 40 reaches the target position P'i−1 of the i-th control cycle. Accordingly, the PLC 10 can acquire the "imaging result corresponding to the control cycle 2k control cycles before" repeatedly in k times the control cycle at the latest in the (i+k)-th control cycle.

The PLC 10 generates the corrected paths C'i+k to C'i+2k−1 of the (i+k+1)-th to (i+2k)-th control cycles using the imaging result acquired by the imaging result acquiring part 160. That is, the PLC 10 acquires the imaging result at the latest in the (i+k)-th control cycle, and generates the corrected paths C'i+k to C'i+2k−1 of the (i+k+1)-th to (i+2k)-th control cycles using the acquired imaging result.

Accordingly, the PLC 10 can generate the corrected paths C' by acquiring the imaging result of a desired part of the workpiece repeatedly in k times the control cycle instead of the imaging result of the whole workpiece.

The PLC 10 can generate the corrected paths C'i+k to C'i+2k−1 of the (i+k+1)-th to (i+2k)-th control cycles using the imaging result acquired at the latest in the (i+k)-th control cycle. That is, the PLC 10 acquires the imaging result corresponding to the control cycle 2k control cycles before repeatedly in k times the control cycle and generates the corrected paths C'i+k to C'i+2k−1 of the (i+k+1)-th to (i+2k)-th control cycles at the latest in the (i+k)-th control cycle.

Accordingly, the PLC 10 can acquire the imaging result of a desired part of the workpiece repeatedly in k times the control cycle without interrupting generation of the corrected path C'i for each control cycle and generate the corrected path C'i for each control cycle.

In the PLC 10, the correction part 120 may generate the corrected paths C'i (where i=0, 1, 2, . . . , 2k−1) of the first to 2k-th control cycles in advance, and the imaging result acquiring part 160 may start acquisition of the imaging result corresponding to the target position P'3$k$−1 of the corrected path C'3$k$−1 of the 3k-th control cycle at the latest at a time point at which the dispenser 40 reaches the target position P'k−1 of the corrected path C'k−1 of the k-th control cycle.

According to this configuration, the PLC 10 generates the corrected paths C'i (where i=0, 1, 2, . . . , 2k−1) of the first to 2k-th control cycles in advance. The PLC 10 starts acquisition of the imaging result corresponding to the target position P'3$k$−1 of the corrected path C'3$k$−1 of the 3k-th control cycle at the latest at the time point at which the dispenser 40 reaches the target position P'k−1 of the corrected path C'k−1 of the k-th control cycle.

That is, the PLC 10 performs control using the corrected paths C'i (where i=0, 1, 2, . . . , 2k−1) of the first to 2k-th control cycles, which have been generated in advance, in the first to 2k-th control cycles.

The PLC 10 starts acquisition of the imaging result corresponding to the target position P'3$k$−1 of the corrected path C'3$k$−1 of the 3k-th control cycle at the latest at the time point at which the dispenser 40 reaches the target position P'k−1 of the corrected path C'k−1 of the k-th control cycle. Accordingly, the PLC 10 acquires the "imaging result corresponding to the target position P'3k−1 of the corrected path C'3k−1 of the 3k-th control cycle" at the latest in the 2k-th control cycle. The PLC 10 generates the corrected paths C'i (where i=2k, 2k+1, 2k+2, 3k−1) of the (2k+1)-th to 3k-th control cycles using the imaging result acquired at the latest in the 2k-th control cycle.

That is, the PLC 10 generates the corrected paths C'i (where i=2k, 2k+1, 2k+2, 3k−1) of the (2k+1)-th to 3k-th control cycles during execution of the control using the corrected paths C'i (where i=0, 1, 2, . . . , 2k−1) of the first to 2k-th control cycles which have been generated in advance.

Accordingly, the PLC 10 can acquire the imaging result of a desired part of the workpiece repeatedly in k times the control cycle without interrupting generation of the corrected path C'i and generate the corrected paths C'i of the control cycles subsequent to the zeroth control cycle.

In the PLC 10, the reference determining part 140 may (1) use the corrected path C'i+2k−1 of the (i+2k)-th control cycle among the corrected paths C'i+k, . . . , C'i+2k−1 of (i+k+1)-th to (i+2k)-th control cycles which are repeatedly generated in k times the control cycle by the correction part 120 to (2) select one normative command from the normative command C'i+3k−1 of the (j+3k)-th control cycle and the normative commands (for example, C'i+3k−2 and C'i+ 3k) of the control cycles before and after the (j+3k)-th control cycle as the normative path Cx for each control cycle corresponding to the corrected path C'i+3k−1 of the (i+3k)-th control cycle.

According to this configuration, the PLC 10 selects one normative command from the normative command C'i+ 3k−1 of the (j+3k)-th control cycle and the normative commands (for example, C'j+3k−2 and C'j+3k) of the control cycles before and after the (j+3k)-th control cycle as the target path corresponding to the corrected path of a (i+3k)-th control cycle as the normative path Cx for each control cycle corresponding to the corrected path C'i+3k−1 of the (j+3k)-th control cycle using the corrected path C'i+2k−1 of the (j+2k)-th control cycle.

As described above, the total distance (length) of the normative command C may not match the total distance (length) of the corrected path C'. The PLC 10 generates the corrected path C'y for each control cycle from the normative path Cx for each control cycle so that the length of the corrected path C'i for each control cycle substantially matches the length of the normative path Ci for the corresponding control cycle. Accordingly, the target position (the end point) of the corrected path C'i of a certain control cycle does not be necessarily approximate to the target position of the normative path Ci in the certain control cycle.

For example, the target position P'i of the corrected path C'i of a certain control cycle which is generated by the PLC 10 may be located closer to the target position Pi−1 of the normative path Ci−1 of the control cycle previous to the certain control cycle than to the target position Pi of the normative path Ci of the certain control cycle. In this case, the PLC 10 generates the corrected path C'i+1 of the control cycle subsequent to the certain control cycle as follows in order to substantially match the lengths of the corrected path C'i and the normative path Ci for each control cycle and to curb a separation therebetween. That is, the PLC 10 generates the corrected path C'i+1 of the control cycle subsequent to the certain control cycle using the normative path Ci of the certain control cycle.

For example, the target position P'i of the corrected path C'i of a certain control cycle which is generated by the PLC 10 may be located closer to the target position Pi+1 of the normative path Ci+1 of the control cycle subsequent to the certain control cycle than to the target position Pi of the normative path Ci of the certain control cycle. In this case, the PLC 10 generates the corrected path C'i+1 of the control cycle subsequent to the certain control cycle as follows in order to substantially match the lengths of the corrected path C'i for each control cycle and the normative path Ci for each control cycle and to curb a separation therebetween. That is, the PLC 10 generates the corrected path C'i+1 of the control cycle subsequent to the certain control cycle using the normative path Ci+2 of the control cycle two control cycles after the certain control cycle.

Accordingly, the PLC 10 determines the normative path Cx of the control cycle which is optimal for generating the corrected path C'i+k of the control cycle k control cycles before using the generated corrected path C'i. Specifically, the PLC 10 selects one normative path from the normative paths C'i+3k−1 of the (j+3k)-th control cycle and normative commands (for example, C'i+3k−2 and Cj+3k) of the control cycles before and after the (j+3k)-th control cycle as the normative path Cx corresponding to the corrected path C'i+3k−1 of the (i+3k)-th control cycle using the corrected path C'i+2k−1 of the (i+2k)-th control cycle. It is assumed that the corrected path C'i+2k−1 is generated using the normative path Cj+2k−1 of the (j+2k)-th control cycle. For example, the PLC 10 determines the normative path Cx corresponding to the corrected path C'i+3k−1 of the (i+3k)-th control cycle from the normative paths Cj+3k−2, Cj+3k−1, and Cj+3k of the (j+3k−1)-th, (j+3k)-th, and (j+3k+1)-th control cycles using the corrected path C'i+2k−1 of the (i+2k)-th control cycle.

Accordingly, the PLC 10 can curb a separation of the corrected path C'i for each control cycle from the normative path Ci for each control cycle and substantially match the length of the corrected path C'i for each control cycle with the length of the normative path Ci for the corresponding control cycle.

In the PLC 10, the correction part 120 may generate vectors indicating the corrected paths C'i corresponding to k continuous control cycles repeatedly in k times the control cycle by performing at least one of rotation and parallel translation on vectors indicating the normative paths Ci corresponding to the k continuous control cycles using the imaging result acquired by the imaging result acquiring part 160.

According to this configuration, the PLC 10 generates the vectors indicating the corrected paths C'i of the control cycles by performing at least one of rotation and parallel translation on the vectors indicating the normative paths Ci of the control cycles using the imaging result.

Accordingly, the PLC 10 can generate the corrected path Ci for each control cycle so that the length of the corrected path C'i for each control cycle substantially matches the length of the normative path Ci for the corresponding control cycle using imaging result.

(Details of Functional Configuration of Control Device)

FIG. 1 is a block diagram illustrating a configuration of principal parts of the PLC 10 according to a first embodiment of the disclosure. As illustrated in FIG. 1, the PLC 10 includes an acquisition part 110, a correction part 120, a correction value calculating part 130, a reference determining part 140, a range designating part 150, an imaging result acquiring part 160, and an output part 180. The PLC 10 is an entity that performs a control process of controlling the dispenser 40.

In order to ensure simplicity of description, an element not directly associated with this embodiment is omitted from the description and the block diagram. The PLC 10 may include the omitted element on the basis of actual conditions for implementation. The acquisition part 110, the correction part 120, the correction value calculating part 130, the reference determining part 140, the range designating part 150, the imaging result acquiring part 160, and the output part 180 illustrated in FIG. 1 can be embodied, for example, by causing a processor (a central processing unit (CPU) or the like) to read a program stored in a nonvolatile memory (a storage part 170), which is embodied by a read only memory (ROM), a nonvolatile random access memory (NVRAM), or the like, to a main memory which is embodied by a RAM and to executed the read program. The functional blocks of the PLC 10 will be described below.

(Functional Blocks Other than Storage Part)

The acquisition part 110 acquires a normative path (a normative command) Ci for each control cycle with reference to a normative path table 171, and outputs the acquired normative path Ci to the correction part 120. The acquisition part 110 acquires normative paths Ci (where i=0, 1, 2, . . . , 2k−1) of the first to 2k-th control cycles with reference to the normative path table 171 before the PLC 10 starts its control operation, and outputs the acquired normative paths Ci to the correction part 120. The acquisition part 110 acquires the normative path Ci of the control cycle instructed from the reference determining part 140 with reference to the normative path table 171 while the PLC 10 is performing the control operation, and outputs the acquired normative path Ci to the correction part 120. When the reference determining part 140 instructs the x-th normative path Cx−1 while the PLC 10 is performing the control operation, the acquisition part 110 may output the normative paths Ci (where i=x−k, x−k+1, . . . , x−1) of the (x−k+1)-th to x-th control cycles to the correction part 120.

The correction part 120 corrects the normative paths Ci acquired from the acquisition part 110 using a correction value transmitted from the correction value calculating part 130, and stores the corrected normative paths Ci as the corrected paths C'i in a corrected path table 172. The correction part 120 generates k corrected paths C'y to C'y+k−1, for example, by correcting k normative paths Cx to Cx+k−1 acquired from the acquisition part 110 using the correction value transmitted from the correction value calculating part 130 (where x and y are integers equal to or greater than 0). Specifically, the correction part 120 causes the normative paths Cx to Cx+k−1 to translate in parallel by an amount of displacement transmitted from the correction value calculating part 130 and to rotate by an amount of rotation transmitted from the correction value calculating part 130 and generates k corrected paths C'y to C'y+k−1.

The correction value calculating part 130 calculates a correction value (specifically, an amount of rotation and an amount of displacement) using feature point information acquired by the imaging result acquiring part 160, and transmits the calculated correction value to the correction part 120. The correction value calculating part 130 calculates the correction value, for example, using the method described above with reference to FIGS. 9A, 9B, 10A, 10B, and 14A to 14C.

The correction value calculating part 130 calculates an amount of rotation and an amount of displacement for generating a normative path Ci+k−1 from the normative path Cx using the normative path Cx determined as a basis of the "corrected path C'i+k−1 of the (i+k)-th control cycle" by the reference determining part 140. That is, the correction value calculating part 130 calculates an amount of rotation (a slope) and an amount of translation (a displacement) for a "line connecting a start point of Cx−k+1 to an end point of Cx" and a "line correcting a target position P'i−1 of C'i−1 to a feature point corresponding to C'i+k−1."

For example, the correction value calculating part 130 may calculate an amount of rotation in which a deviation is minimized for a "line passing through a start point (a start position) of a corrected command and a detected feature point" using a least square method. The correction value calculating part 130 may calculate an amount of rotation and an amount of displacement for selecting a corrected path in which an area surrounded by the corrected path and the outline of the actual object is minimized in a group of "corrected paths" satisfying a predetermined rule (such as a clearance) for the outline of the object.

The reference determining part 140 determines a normative path Cx serving as a basis of the corrected path C'i+k−1 of the (i+k)-th control cycle using the corrected path C'i−1 of the i-th control cycle with reference to the corrected path table 172. The reference determining part 140 notifies the acquisition part 110 and the range designating part 150 (and the imaging result acquiring part 160) of the determined normative path Cx.

For example, as described with reference to FIGS. 11 to 13, the reference determining part 140 determines the normative path Cx serving as a basis of the corrected path C'i+k−1 using the generated corrected path C'i−1. That is, the reference determining part 140 determines Cx on the basis of a positional relationship between a "target position P'i−1 of the corrected path C'i−1" and a "target position Py of a normative path Cy serving as a basis of the corrected path C'i−1" and a distance therebetween.

The reference determining part 140 may select a "normative path having a shortest distance from the target position P'i−1 of the corrected path C'i−1" as the normative path Cx.

The reference determining part 140 generates normal line information of the determined normative path Cx using the method described with reference to FIG. 9A and FIG. 14A. That is, the reference determining part 140 causes the normative paths Cx−k+1 to Cx to translate so that the start point of the normative path Cx−k+1 is the target position P'i−1 of the corrected path C'i−1 of the i-th control cycle with respect to the normative path Cx serving as a basis of the corrected path C'i+k−1 of the (i+k)-th control cycle, and calculates a normal line of the translated normative path Cx. For example, in the example illustrated in FIG. 14B, k=1 is set, and the reference determining part 140 causes the normative path Cb to translate so that the start point of the normative path Cb serving as a reference of the corrected path C'2 of the third control cycle is the target position P'1 of the corrected path C'1 of the second control cycle. Then, the reference determining part 140 calculates a normal line of the translated normative path Cb. The reference determining part 140 notifies the acquisition part 110 and the range designating part 150 (and the imaging result acquiring part 160) of normal line information indicating the calculated normal line.

The range designating part 150 designates a part of the actual object corresponding to the "target position Px of the normative path Cx determined by the reference determining part 140" as an imaging range of the camera 60, and outputs the designated range as the range designation to the image processing device 50. The image processing device 50 causes the camera 60 to image the range designated in the range designation (a part of the actual object) in accordance with the range designation received from the range designating part 150.

As described above, the range designating part 150 may also output the normal line information of the "normative path Cx determined by the reference determining part 140" to the image processing device 50. More specifically, the range designating part 150 may output information indicating the normal line of the "normative path Cx which has translated so that the start point of Cx−k+1 is the target position P'i−1 of the corrected path C'i−1" to the image processing device 50. The range designating part 150 may cause the image processing device 50 to measure a feature point in the normal line of the normative path Cx from the "range designated in the range designation of the actual object."

The range designating part 150 may designate information indicating a "line having a shortest distance when a perpendicular line is drawn to the outline of the actual object" as the normal line information of the "normative path Cx determined by the reference determining part 140." The range designating part 150 may cause the image processing device 50 to measure a feature point of the actual object from a specific pattern or the like detected from a circular area centered on the target position Px of the normative path Cx.

The imaging result acquiring part 160 acquires feature point information (information indicating the shape of a "range of the actual object designated in the range designation") which is an analysis result (a detection result) of the captured image from the camera 60 from the image processing device 50. The imaging result acquiring part 160 may acquire a captured image which has been captured in advance by the camera 60 before starting the operation (in a stopped state) from the image processing device 50.

The imaging result acquiring part 160 measures a feature point in the normal line of the normative path Cx determined by the reference determining part 140 using information indicating the shape of the "range of the actual object designated in the range designation" or a captured image of the "range of the actual object designated in the range designation." Then, the imaging result acquiring part 160 outputs information such as coordinates of the position of the measured feature point (feature point information) to the correction value calculating part 130.

As described above, the range designating part 150 may output the "normal line information of the normative path Cx determined by the reference determining part 140" to the image processing device 50, and cause the image processing device 50 to measure the feature point in the normal line of the normative path Cx from the "range of the actual object designated in the range designation." In this case, the imaging result acquiring part 160 acquires feature point information (information such as coordinates of the position of the feature point measured by the image processing device 50) as the measurement result from the image processing device 50 and outputs the feature point information to the correction value calculating part 130.

The output part 180 sequentially outputs the corrected path Ci (where i is an integer equal to or greater than 0) for each control cycle to the servo driver 20 with reference to the corrected path table 172.

(Details of Storage Part)

The storage part 170 is a storage device that stores a variety of data which is used by the PLC 10. The storage part 170 may store (1) a control program which is executed by the PLC 10, (2) an OS program, (3) an application program for implementing various functions of the PLC 10, and (4) a variety of data which is read when the application program is executed in a non-transitory manner. The storage part 170 stores the normative path table 171 and the corrected path table 172.

The normative path Ci for each control cycle generated from the normative paths C (the normative commands) is stored in the normative path table 171. The corrected path C'i for each control cycle generated by the correction part 120 is stored in the corrected path table 172.

(Outline of Process Flow which is Performed by Control Device)

Figure 15A:
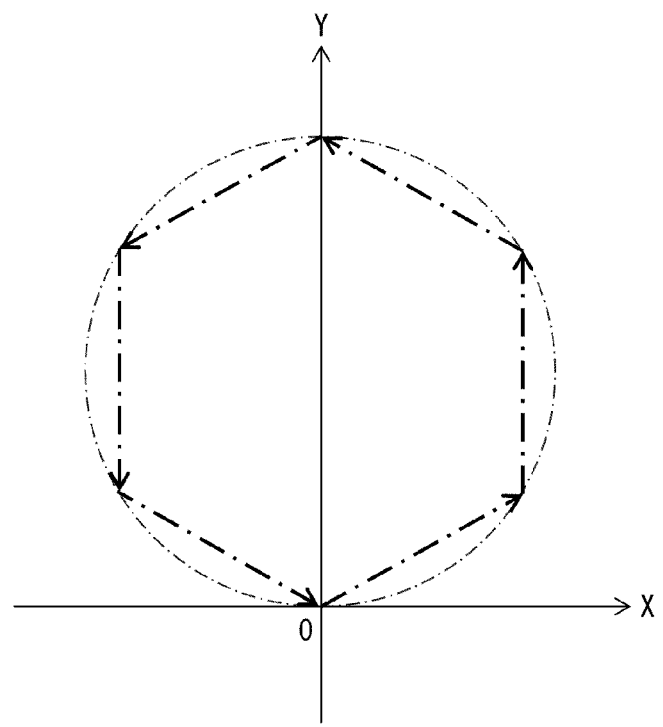
FIG. 15A and FIG. 15B are diagrams illustrating a premise of a control process which is described with reference to FIGS. 16A to 23.
Figure 15B:
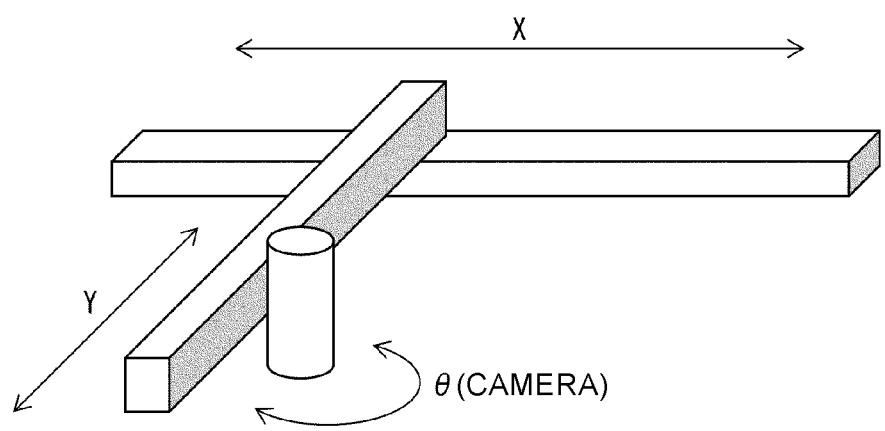

FIG. 15 is a diagram illustrating a premise of a control process (that is, a process of generating a corrected path C'i) which is performed by the PLC 10 and which is described with reference to FIGS. 16 to 23. As illustrated in FIG. 15A, a circular outline on an XY plane of which six control cycles make a round is considered as a path serving as a norm (a normative path C). A path using minute segments by control cycles for a command (a normative path C) is a regular hexagonal path. As illustrated in FIG. 15B, it is assumed in the following description that the camera 60 along with the dispenser 40 which is a control object is attached to the servo motor 30 (an XY orthogonal robot). The camera 60 is attached to an θ shaft which is used to perform so-called "normal line control" and which is parallel to a direction of an application path.

The PLC 10 can be applied to a configuration in which "the dispenser 40 is fixed and a workpiece moves on an XY table (the servo motor 30 performs position control of the workpiece instead of the dispenser 40)." The PLC 10 can be applied to a configuration in which "the dispenser 40 is a Y-axis uniaxial robot and a workpiece moves on an X-axis table."

The camera 60 does not have to be attached to the dispenser 40, may be installed to overlook the dispenser 40 from above a device such as the dispenser 40, and may not be subjected to normal line control. It is assumed that a blind spot due to a device or the like does not occur in imaging by the camera 60 so that at least an image of the shape of a workpiece required for performing correction can be acquired in correction of path control. In order to prevent a blind spot from occurring, a plurality of cameras 60 may be used. In an initial state, (X, Y, θ)=(0, 0, 0) is assumed, that is, it is assumed that the dispenser 40 and the camera 60 are located at positions of 0 on the X axis and the Y axis and the camera 60 faces a direction along the X axis.

Figure 16A:
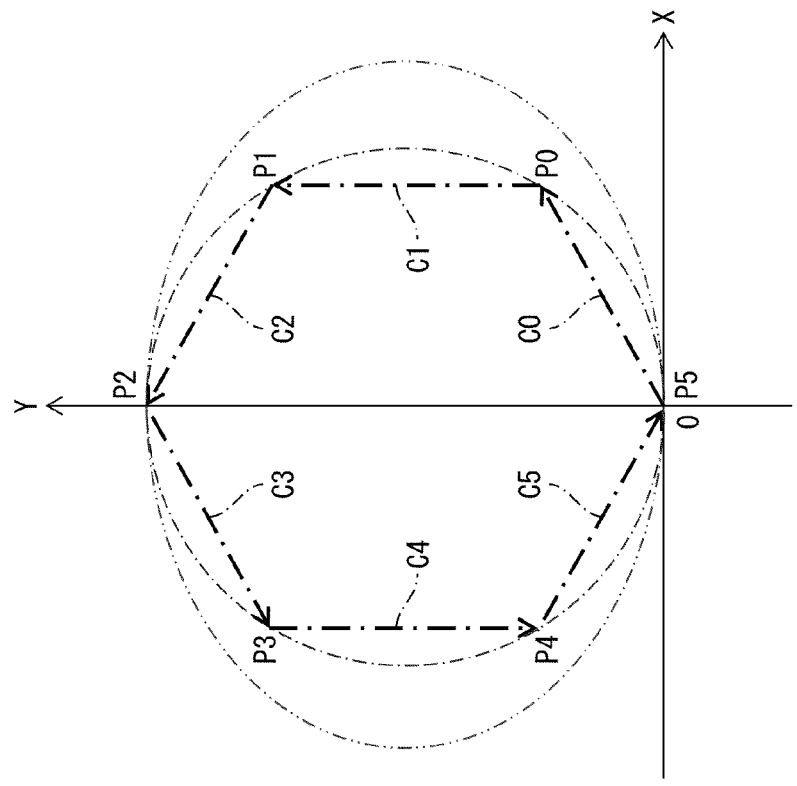
FIG. 16A and FIG. 16B are diagrams illustrating a normative path or the like in the control process which is described with reference to FIGS. 17A to 23.
Figure 16B:
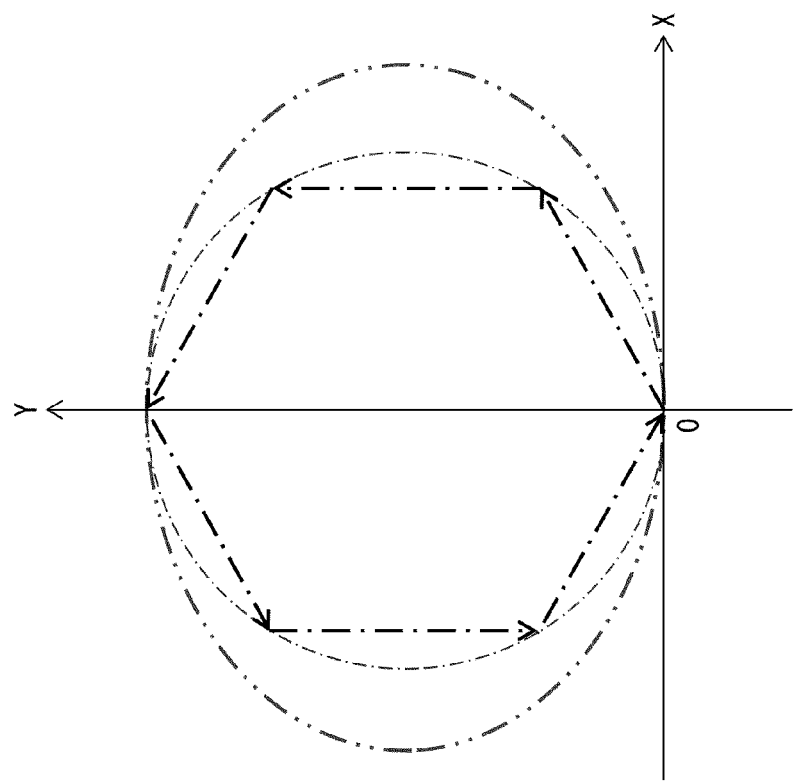

FIG. 16A and FIG. 16B are diagrams illustrating a path serving as a norm (a normative path C), a shape of an actual object (an actual workpiece), and a normative path Ci and a target position Pi for each control cycle in the control process which is performed by the PLC 10 and which is described with reference to FIGS. 17A to 23. In FIG. 16A and FIG. 16B, an ellipse indicated by an alternate long and two short dashes line represents a shape of an actual object. In actual application or the like, a process of "taking a clearance of a margin" from the shape of the actual object is assumed, but it is assumed in the following description that the outline of the actual object is a corrected path (a corrected path C'i) for the purpose of easy understanding of the PLC 10. In FIG. 16A and FIG. 16B, a circle indicated by an alternate long and short dash line represents a path serving as a norm (a normative path C), and the corrected path C' is assumed to have an elliptical shape having a dimensional error in the X-axis direction.

1. Preparation 1.1. Generation of Normative Path Data

For the purpose of easy understanding of the PLC 10, it is assumed in the following description that control which is performed by the PLC 10 does not include acceleration or deceleration and the normative path C is a hexagonal path passing through six points on a circular outline in six control cycles as illustrated in FIG. 16B. That is, the normative path C includes a sequence of six commands (C0 to C5) with the passed six points (P0 to P5) as target positions.

1.2. Generation of First and Next Corrected Commands (Before Starting Operation)

The correction part 120 of the PLC 10 generates corrected paths C'0 and C'1 for normative paths C0 and C1 in advance (that is, before starting the operation of the PLC 10, that is, before execution of a control process is started by the PLC 10).

Figure 17A:
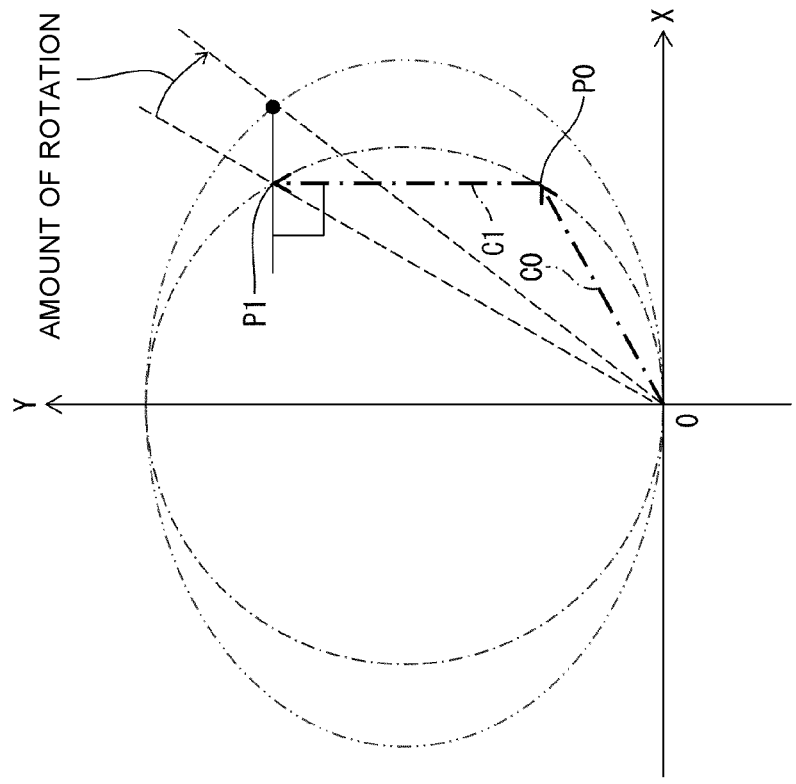
FIG. 17A and FIG. 17B are diagrams illustrating an example of a method of detecting and calculating feature points required for generating a corrected command which is performed by the PLC illustrated in FIG. 1.
Figure 17B:
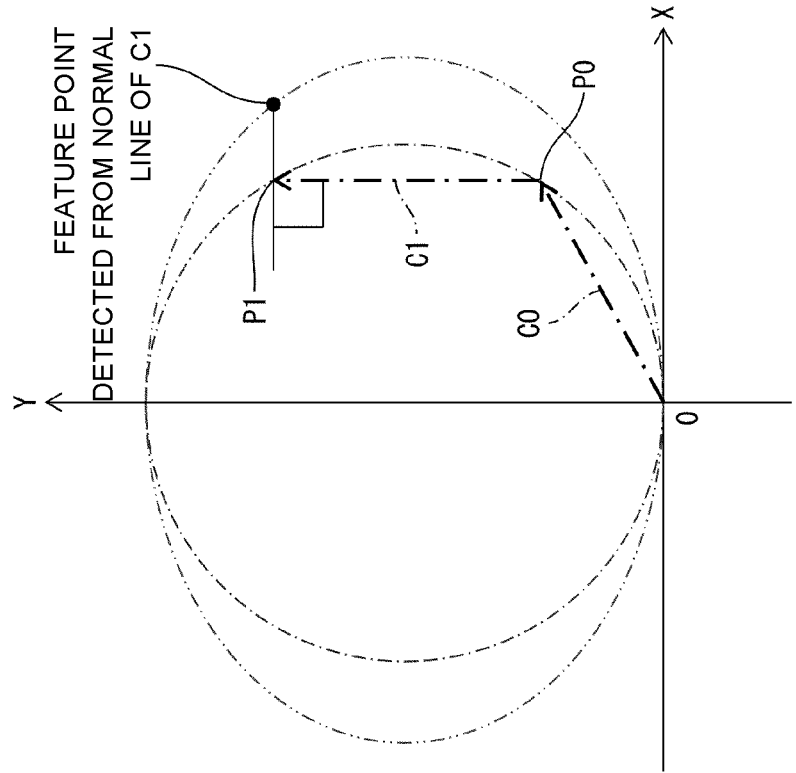

FIG. 17A and FIG. 17B illustrate an example of a method of detecting feature points required for generating the corrected paths C'0 and C'1 from the normative paths C0 and C1 and calculating an amount of rotation (a slope) and an amount of translation (a displacement) which is performed by the PLC 10.

As illustrated in FIG. 17A, (1) the image processing device 50 detects a shape of a desired part of an actual object (for example, an edge/boundary of the desired part) from a captured image which has been captured by the camera 60 in advance before the PLC 10 starts an operation (a stopped state) and measures a feature point on a normal line of the normative path C1. The image processing device 50 outputs information such as coordinates of a position of the detected feature point (feature point information) to the PLC 10. The imaging result acquiring part 160 of the PLC 10 acquires the feature point information from the image processing device 50 and outputs the acquired feature point information to the correction value calculating part 130.

The measurement of a feature point on the normal line of the normative path C1 may be performed by the imaging result acquiring part 160. That is, the imaging result acquiring part 160 may acquire a captured image which has been captured by the camera 60 in advance before the PLC 10 starts an operation (the stopped state) from the image processing device 50. The imaging result acquiring part 160 may detect a feature point on the normal line of the normative path C1 and output information such as coordinates of the position of the detected feature point (feature point information) to the correction value calculating part 130.

(2) The correction value calculating part 130 calculates an amount of rotation (a slope) and an amount of translation (a displacement) for a "line connecting a start point of the normative path C0 to an end point of the normative path C1" and a "line connecting a start position (an initial position) to the detected feature point" using the feature point information acquired from the imaging result acquiring part 160. That is, the correction value calculating part 130 calculates an "amount of translation (a displacement)" which is an amount used to move the start point of the normative path C0 to the start position (the initial position). The correction value calculating part 130 calculates an "amount of rotation (a slope)" which is required for making the "line connecting the start point of the normative path C0 to the end point of the normative path C1" be parallel to the "line connecting the start position (the initial position) to the detected feature point" (FIG. 17B). In the example illustrated in FIG. 17B, it is assumed that there is no translation from the start position (the initial position) of the normative path C0 for the purpose of easy understanding of the PLC 10.

The connection value calculating part 130 notifies the correction part 120 of the calculated amount of rotation (slope) and the calculated amount of translation (displacement).

Figure 18:
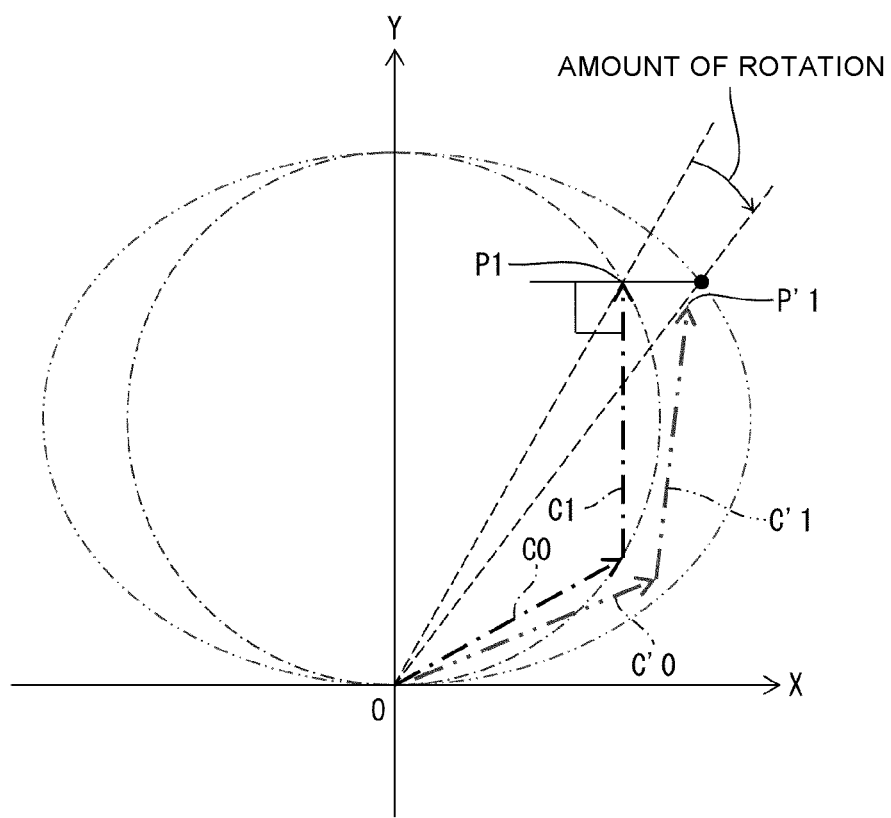
FIG. 18 is a diagram illustrating an example of a method of generating a corrected command using calculated rotation and translation which is performed by the PLC illustrated in FIG. 1.

FIG. 18 illustrates an example of a method of generating the corrected paths C'0 and C'1 from the normative paths C0 and C1 using the calculated amount of rotation (slope) and the calculated amount of translation (displacement) which is performed by the PLC 10. As illustrated in FIG. 18, (3) the correction part 120 generates the corrected paths C'0 and C'1 to which the normative paths C0 and C1 are converted by the amount of rotation and the amount of translation are calculated by the correction value calculating part 130, and stores the generated corrected paths C'0 and C'1 in the corrected path table 172.

2. Start of Operation Based on Corrected Command C'0

That is, the output part 180 outputs the corrected paths C'0 and C'1 stored in the corrected path table 172 to the servo driver 20 and causes the servo driver 20 to perform a control process for realizing the corrected paths C'0 and C'1.

3. Generation of Corrected Command C'2 at the Time of Ending of Operation Based on Corrected Command C'0

The correction part 120 of the PLC 10 performs the following processes from "3.1." to "3.3." and generates the corrected path C'2 at a time point at which the operation based on the corrected path C'0 ends. The correction part 120 generates a corrected path C'i+m−1 of a control cycle m cycles before the i-th control cycle at a time point at which the dispenser 40 reaches the target position Pi−1 of the i-th control cycle. In the following description, i=1 and m=2 (k=1) are assumed. The "time point at which the operation based on the corrected path C'0 ends" is a "time point at which the operation based on the corrected path C'1 starts," that is, a "time point at which the dispenser 40 is located at P'0 which is an end point of the corrected path C'0."

FIG. 19A and FIG. 19B are diagrams illustrating an example of a method of selecting a normative path Cx serving as a basis of the corrected path C'2 and a method of detecting a feature point for generating the corrected path C'2 which are performed by the PLC 10. FIG. 20A and FIG. 20B are diagrams illustrating an example of a method of calculating an amount of rotation (a slope) and an amount of translation (a displacement) for generating the corrected path C'2 and a method of generating the corrected path C'2 by the calculated amount of rotation and the calculated amount of translation which are performed by the PLC 10.

3.1. Selection/Determination of Normative Path Cx Serving as Reference (Reference Source)

The reference determining part 140 of the PLC 10 determines on the basis of which normative path Cx to generate the corrected path C'2 m cycles before from the relationship between the destination P'1 of the corrected path C'1 and a destination (a target position) P1 of the normative path C1 serving as a basis thereof which is stored in the corrected path table 172.

The reference determining part 140 determines the normative path Cx serving as a basis of a corrected path C'i+m−1 of the control cycle m cycles before the control cycle in which the control object reaches a current position as follows. That is, the reference determining part 140 determines the normative path Cx using a "target position P'i−k+1 of the previously generated corrected path C'i−k+1" and a "target position Py of the normative path Cy serving as a reference of the previously generated corrected C'i−k+1." For example, the reference determining part 140 determines the normative path Cx serving as a basis of the corrected path C'i+m−1 of the control cycle m cycles before the i-th control cycle as follows at the latest at a "time point at which the dispenser 40 reaches the target position Pi−1 of the i-th control cycle." That is, the reference determining part 140 determines the normative path Cx serving as a basis of the corrected path C'i+m−1 using the corrected path C'i+k−1 of the control cycle k cycles before the i-th control cycle.

(1) the reference determining part 140 calculates a vector L from the "target position P'1 of the corrected path C'1" to the "target position P1 of the normative path C1 serving as a reference of the corrected path C'1" (FIG. 19A).

(2) The reference determining part 140 determines whether the target position P'1 based on the corrected path "does not reach (lags behind)" or "advances after (leads)" the original command position (the target position) P1 from the "direction of L." (3) The reference determining part 140 determines the normative path which is referred to in the next cycle from the "length of L" in addition to determination of lagging/leading of the corrected path from the "direction of L."

The reference determining part 140 selects the normative path C2 as an original command (a command serving as a basis) of the corrected path C'2 when the "length of the vector L is equal to or less than half the length of the normative path C1." The reference determining part 140 selects the normative path C1 as an original command of the corrected path C'2 when the "length of the vector L is larger than half the length of the normative path C1" and the "target position P'1 does not reach (lags behind) the target position P1." The reference determining part 140 selects the normative path C3 two cycles after the normative path C1 as an original command of the corrected path C'2 when the "length of the vector L is larger than half the length of the normative path C1" and the "target position P'1 advances after (leads) the target position P1."

In the example illustrated in FIG. 19A, since L lags behind the original P1 and the length of L is "equal to or less than half the length of the normative path C1," the reference determining part 140 selects the normative path C2 as an original command of the corrected path C'2.

3.2. Imaging Trigger

As described above, the range designating part 150 gives a trigger for imaging and detecting a feature point for generating the corrected path C'2 along with a range designation to the image measuring means (the image processing device 50). The imaging result acquiring part 160 of the PLC 10 acquires, for example, information indicating a shape of a "range designated in the range designation" of the actual object (for example, information indicating a curve constituting an edge/boundary of the range) as feature point information.

The range designating part 150 may give normal line information on the normative path serving as a reference determined in "3.1." to the image processing device 50. Thereafter, the range designating part 150 gives a trigger for imaging, detection, and measurement along with the range designation to the image processing device 50. The imaging result acquiring part 160 of the PLC 10 may acquire, for example, a measurement result of a feature point on a normal line which is measured using the information indicating the shape of the "range designated in the range designation" of the actual object and the normal line information as the feature point information. For example, the imaging result acquiring part 160 may acquire coordinates of an intersection between the curve constituting an edge/boundary of the "range designated in the range designation" of the actual object and the normal line indicated by the normal line information as the feature point information.

3.3. Generation of Corrected Command C'2

The correction part 120 generates the corrected path C'2 from the normative path C2 serving as a source using the same method as in "1.2." That is, (1) the correction value calculating part 130 connects the normative path C2 serving as a source for generation of the corrected path C'2 to the target position P'1 (that is, performs translation so that the start point of the normative path C2 becomes the target position P'1) and detects a feature point in the normal line of the translated normative path C2 (FIG. 19B).

(2) The correction value calculating part 130 calculates an amount of rotation (a slope) and an amount of translation (a displacement) for the "normative path C2" and a "line connecting the target position P'1 to the detected feature point" (FIG. 20A). The correction value calculating part 130 notifies the correction part 120 of the calculated amount of rotation (slope) and the calculated amount of translation (displacement). (3) The correction part 120 generates the corrected path C'2 to which the normative path C2 is converted by the amount of rotation and the amount of translation calculated by the correction value calculating part 130 (FIG. 20B).

4. Generation of Corrected Command C'3 at the Time of Ending of Operation Based on Corrected Command C'1

The correction part 120 generates the corrected command C'3 at a time point at which the operation based on the corrected command C'1 ends (that is, a time point at which the operation of the corrected command C'2 starts and a time point at which the dispenser 40 is located at P'1).

Figures 21A, 21B:
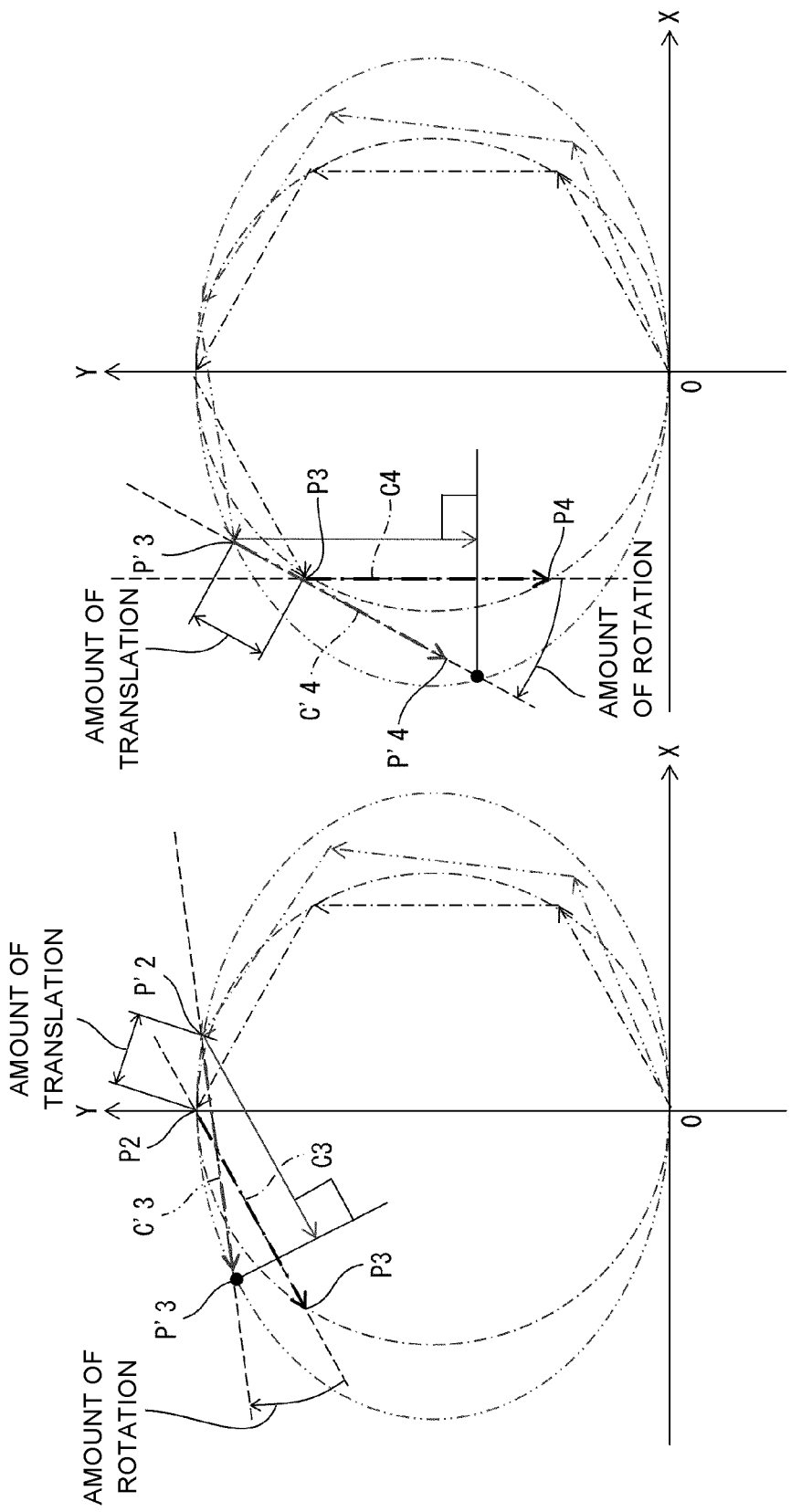
FIG. 21A and FIG. 21B are diagrams illustrating an example of a method of generating corrected commands C'3 and C'4 which is performed by the PLC illustrated in FIG. 1.
Figures 22A, 22B:
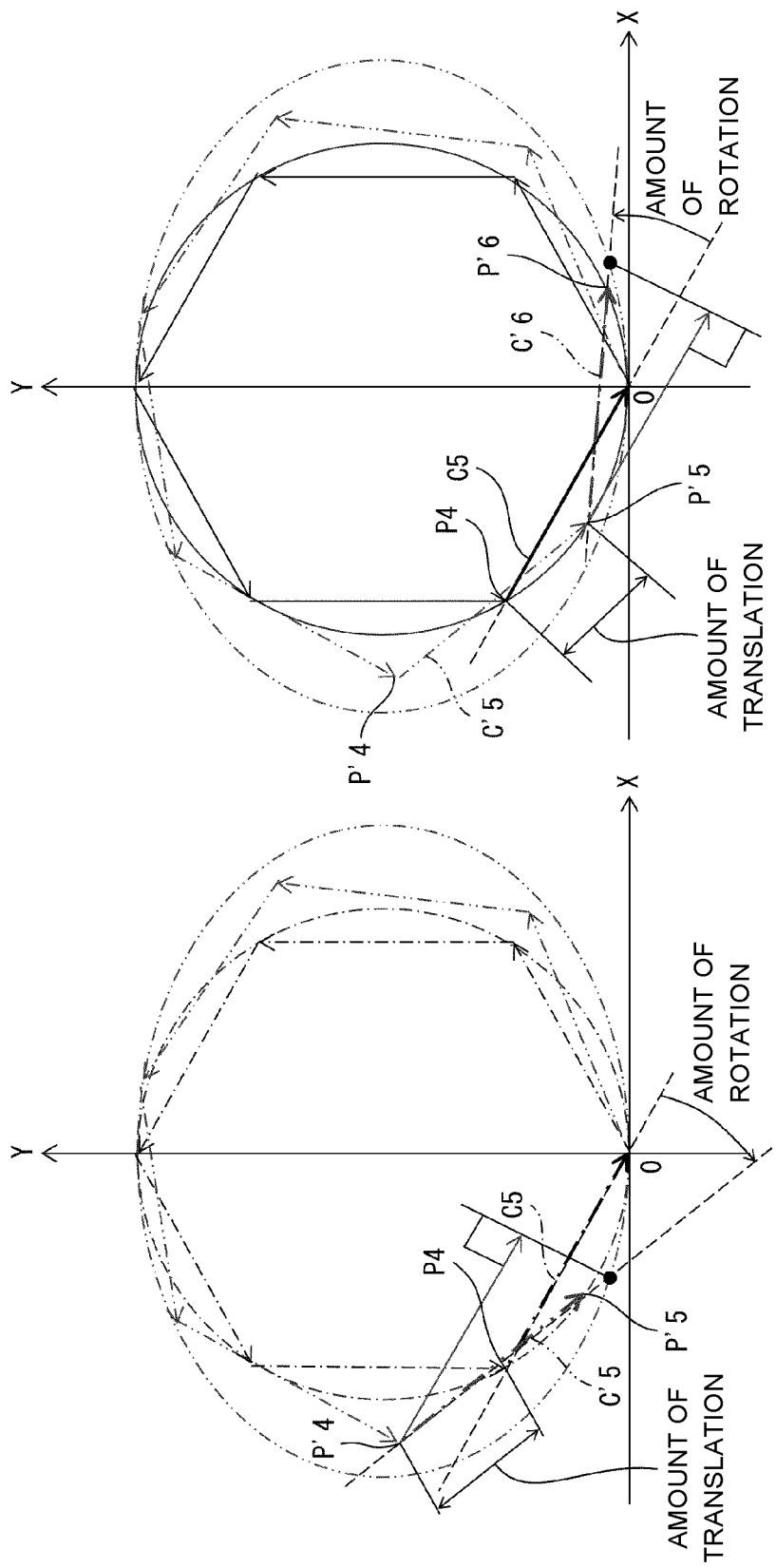
FIG. 22A and FIG. 22B are diagrams illustrating an example of a method of generating corrected commands C'5 and C'6 which is performed by the PLC illustrated in FIG. 1.

FIG. 21A and FIG. 21B are diagrams illustrating an example of a method of generating corrected paths C'3 and C'4 which is performed by the PLC 10. FIG. 22A and FIG. 22B are diagrams illustrating an example of a method of generating corrected paths C'S and C'6 which is performed by the PLC 10. As illustrated in FIGS. 21A, 21B, 22A and 22B, the PLC 10 generates the corrected paths C'3, C'4, and C'S on the basis of the normative paths C3, C4, and C5 by repeatedly performing the process of "3." thereafter.

Here, since the distance between P5 and the target position P'S is a length larger than "half the length of the normative path C5" at a time point at which the corrected path C'S is generated, the reference determining part 140 selects the normative path C5 as the normative path serving as a basis of the next corrected path C'6. The correction part 120 generates the corrected path C'6 on the basis of the normative path C5 selected by the reference determining part 140.

That is, the correction value calculating part 130 detects a feature point in the normal line of a vector connecting the normative path C5 to the target position P'S in the order described in "3.3.(1)." The correction value calculating part 130 calculates an amount of rotation (a slope) and an amount of translation (a displacement) in the order described in "3.3.(2)" (FIG. 22B). Then, the correction part 120 generates the corrected path C'6 to which the normative path C5 is converted by the amount of rotation and the amount of translation calculated by the correction value calculating part 130.

Figure 23:
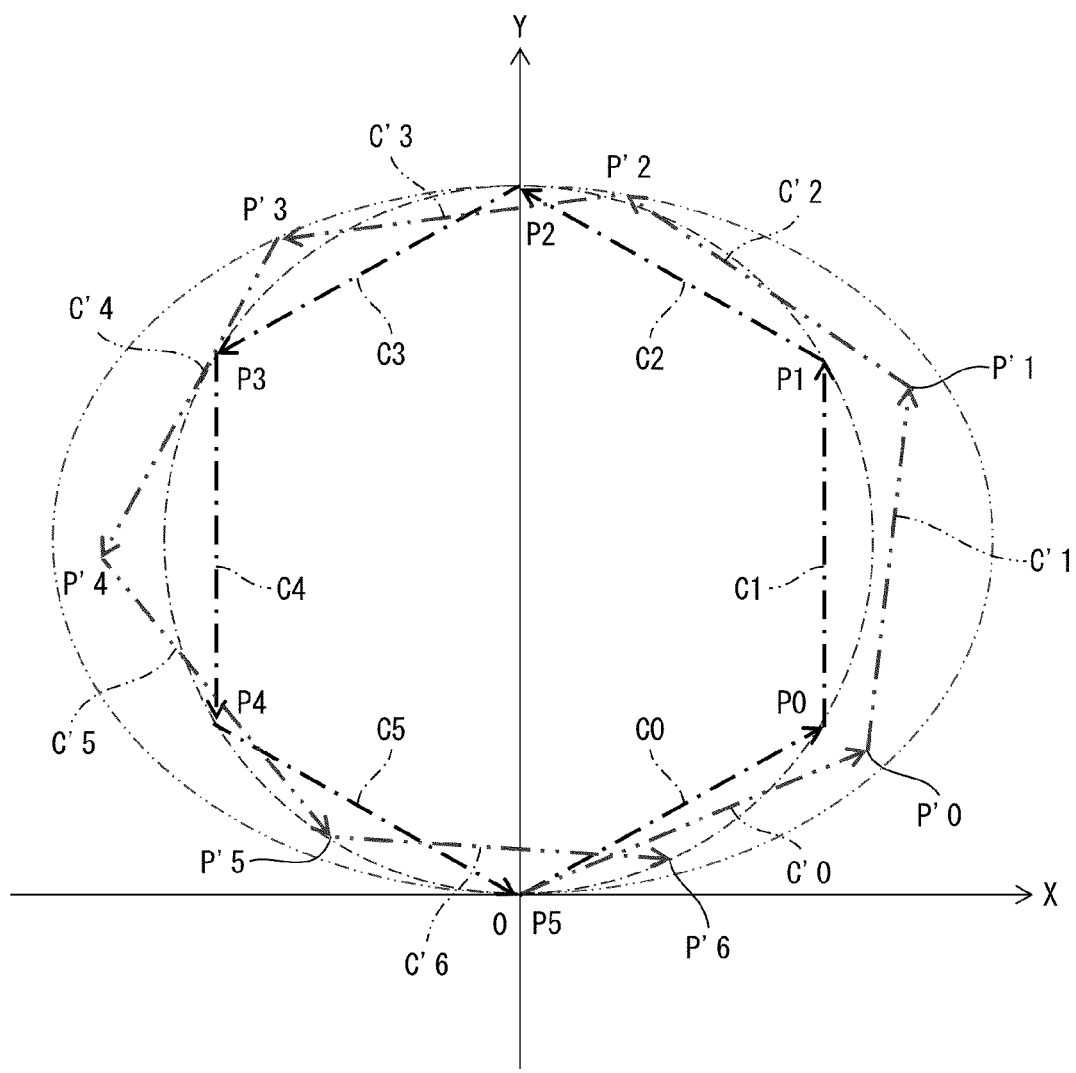
FIG. 23 is a diagram illustrating comparison of corrected commands C'0 to C'6 generated by the PLC illustrated in FIG. 1 with normative commands C0 to C5.

FIG. 23 is a diagram illustrating comparison of the corrected commands C'0 to C'6 generated by the PLC 10 with the normative commands C0 to C5. As illustrated in FIG. 23, finally, the PLC 10 generates the corrected paths C'0 to C'6 passing seven points of the target positions P'0 to P'6 by detecting differences between the normative paths C0 to C5 passing through six points of the target positions P0 to P5 and the actual workpiece.

As described above, the control method which is performed by the PLC 10 is a control method for a control device that generates a corrected path C' which is obtained by correcting a normative command C (a target path) for the dispenser 40 (a control object) moving along a surface of a workpiece using an imaging result (specifically, feature point information) of the workpiece, and the control method includes an acquisition step (such as S402) of acquiring a normative path Ci (a target path) for each control cycle and a generation step (such as S109) of generating a corrected path C'i for each control cycle from the normative path Ci for each control cycle so that the length of the corrected path C'i for each control cycle substantially matches the length of the normative path Ci for each control cycle.

According to this method, the control method generates the corrected path C' by correcting the normative command C using the imaging result of the workpiece, and the length of the corrected path C'i for each control cycle substantially matches the length of the normative path Ci for each control cycle.

Accordingly, the control method can correct the normative command C for the dispenser 40 moving along a surface of a workpiece using an imaging result of the workpiece and keep a moving distance for each control cycle of the dispenser 40 constant.

*4. Modified Example (Regarding Control Device)

In the above-mentioned embodiment, an international electrotechnical commission (IEC) controller which is a sequence control device such as the PLC 10 has been described above as the control device (controller) according to the disclosure. However, the control device according to the disclosure is not limited to the IEC controller but can be applied to various control devices. For example, the control device according to the disclosure may be a numerical control (NC) controller which is a numerical control device.

(Regarding Normative Command)

The PLC 10 does not have to store normative commands Ci (that is, normative paths C) of all control cycles in the normative path table 171. For example, the PLC 10 may include the normative path table 171 as a buffer with a constant size, read a normative command Ci for each control cycle every time from an external storage device or the like, corrects the read normative command Ci for each control cycle, and generate the corrected command C'i for each control cycle.

[Implementation Example by Software]

The control blocks (particularly, the acquisition part 110, the correction part 120, the correction value calculating part 130, the reference determining part 140, the range designating part 150, the imaging result acquiring part 160, and the output part 180) of the PLC 10 may be implemented by logical circuits (hardware) formed on an integrated circuit (an IC chip) or may be implemented by software.

In the latter, the PLC 10 includes a computer that executes commands of a program which is software for implementing the functions. The computer includes, for example, one or more processors and includes a computer-readable recording medium having the program stored therein. By causing the processor to read the program from the recording medium and to execute the read program in the computer, the intended result of one or some exemplary embodiments of the disclosure is achieved. For example, a central processing unit (CPU) can be used as the processor. A "non-transitory physical medium" such as a tape, a disk, a card, a semiconductor memory, or a programmable logic circuit in addition to a read only memory (ROM) can be used as the recording medium. The computer may further include a random access memory in which the program is loaded or the like. The program may be supplied to the computer via an arbitrary transmission medium (such as a communication network or broadcast waves) that can transmit the program. An aspect of the disclosure may be embodied in the form of a data signal which is embedded in carrier waves in which the program is embodied by electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device that generates a corrected path which is obtained by correcting a target path for a control object moving along a surface of a workpiece using an imaging result of the workpiece, the control device comprising a hardware controller configured to:
acquire the target path for each control cycle; and
generate the corrected path for each control cycle from the target path for each control cycle so that a length of the corrected path for each control cycle matches a length of the target path for each control cycle,
wherein the hardware controller further configured to
start acquisition of the imaging result corresponding to a target position of the corrected path of an (i+2k)-th control cycle repeatedly in k times the control cycle at the latest at a time point at which the control object reaches the target position of the corrected path of an i-th control cycle where i is an integer equal to or greater than 1 and k is an integer such that k times the control cycle is larger than a time required from generation of the imaging result to acquisition of the imaging result, and
generate the corrected paths of (i+k+1)-th to (i+2k)-th control cycles using the imaging result.

2. The control device according to claim 1, wherein the hardware controller further configured to select one target path from the target paths of a (j+1)-th control cycle and control cycles before and after the (j+1)-th control cycle as the target path corresponding to a corrected path of an (i+1)-th control cycle when a corrected path of an i-th control cycle is generated from the target path of a j-th control cycle where i and j are integers equal to or greater than 1,
wherein hardware controller generates the corrected path of the (i+1)-th control cycle from the target path of the control cycle.

3. The control device according to claim 2, wherein the hardware controller generates the corrected paths of first to 2k-th control cycles in advance, and
wherein the hardware controller starts acquisition of the imaging result corresponding to the target position of the corrected path of a 3k-th control cycle at the latest at a time point at which the control object reaches the target position of the corrected path of a k-th control cycle.

4. The control device according to claim 3, wherein the hardware controller generates vectors indicating the corrected paths corresponding to k continuous control cycles repeatedly in k times the control cycle by performing at least one of rotation and parallel translation on vectors indicating the target paths corresponding to the k continuous control cycles using the imaging result.

5. A non-transitory computer readable recording medium comprising an information processing program, the information processing program causing a computer to serve as the control device according to claim 3.

6. The control device according to claim 2, wherein the hardware controller selects one target path from the target paths of a (j+3k)-th control cycle and control cycles before and after the (j+3k)-th control cycle as the target path corresponding to the corrected path of an (i+3k)-th control cycle using the corrected path of an (i+2k)-th control cycle among the corrected paths of (i+k+1)-th to (i+2k)-th control cycles which are repeatedly generated in k times the control cycle.

7. A non-transitory computer readable recording medium comprising an information processing program, the information processing program causing a computer to serve as the control device according to claim 6.

8. The control device according to claim 2, wherein the hardware controller generates vectors indicating the corrected paths corresponding to k continuous control cycles repeatedly in k times the control cycle by performing at least one of rotation and parallel translation on vectors indicating the target paths corresponding to the k continuous control cycles using the imaging result.

9. A non-transitory computer readable recording medium comprising an information processing program, the information processing program causing a computer to serve as the control device according to claim 2.

10. The control device according to claim 1, wherein the hardware controller generates the corrected paths of first to 2k-th control cycles in advance, and
wherein the hardware controller starts acquisition of the imaging result corresponding to the target position of the corrected path of a 3k-th control cycle at the latest at a time point at which the control object reaches the target position of the corrected path of a k-th control cycle.

11. The control device according to claim 10, wherein the hardware controller generates vectors indicating the corrected paths corresponding to k continuous control cycles repeatedly in k times the control cycle by performing at least one of rotation and parallel translation on vectors indicating the target paths corresponding to the k continuous control cycles using the imaging result.

12. A non-transitory computer readable recording medium comprising an information processing program, the information processing program causing a computer to serve as the control device according to claim 10.

13. The control device according to claim 1, wherein the hardware controller generates vectors indicating the corrected paths corresponding to k continuous control cycles repeatedly in k times the control cycle by performing at least one of rotation and parallel translation on vectors indicating the target paths corresponding to the k continuous control cycles using the imaging result.

14. A non-transitory computer readable recording medium comprising an information processing program, the information processing program causing a computer to serve as the control device according to claim 13.

15. A non-transitory computer readable recording medium comprising an information processing program, the information processing program causing a computer to serve as the control device according to claim 1.

16. A control method for a control device that generates a corrected path which is obtained by correcting a target path for a control object moving along a surface of a workpiece using an imaging result of the workpiece, the control method comprising:
an acquisition step of acquiring the target path for each control cycle;
a generation step of generating the corrected path for each control cycle from the target path for each control cycle so that a length of the corrected path for each control cycle matches a length of the target path for each control cycle, and generating the corrected paths of (i+k+1)-th to (i+2k)-th control cycles using the imaging result; and
a result acquiring step of starting acquisition of the imaging result corresponding to a target position of the corrected path of an (i+2k)-th control cycle repeatedly in k times the control cycle at the latest at a time point at which the control object reaches the target position of the corrected path of an i-th control cycle where i is an integer equal to or greater than 1 and k is an integer such that k times the control cycle is larger than a time required from generation of the imaging result to acquisition of the imaging result.

\* \* \* \* \*